United States Patent
Hanawa et al.

(10) Patent No.: US 7,994,232 B2
(45) Date of Patent: Aug. 9, 2011

(54) PHOTO-CURABLE COMPOSITION INCLUDING POLYMERIZABLE COMPOUND, POLYMERIZATION INITIATOR, AND DYE

(75) Inventors: Hideo Hanawa, Ashigarakami-gun (JP); Yoshiharu Yabuki, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 430 days.

(21) Appl. No.: 12/190,278

(22) Filed: Aug. 12, 2008

(65) Prior Publication Data

US 2009/0088491 A1    Apr. 2, 2009

(30) Foreign Application Priority Data

Sep. 27, 2007   (JP) ................. 2007-252490

(51) Int. Cl.
*C08F 2/50* (2006.01)
*C08J 3/28* (2006.01)
*C09D 11/10* (2006.01)
*C09D 11/00* (2006.01)

(52) U.S. Cl. ............... 522/166; 522/71; 522/74; 522/78; 522/167; 522/168; 522/170; 522/178; 522/181; 522/909; 106/31.13; 106/31.6; 523/160; 523/300

(58) Field of Classification Search ............ 522/74, 522/71, 113, 121, 168, 170, 178, 181; 106/31.13, 106/31.6; 523/160, 300
See application file for complete search history.

(56) References Cited

U.S. PATENT DOCUMENTS

| | | | |
|---|---|---|---|
| 4,231,742 A | 11/1980 | Clausen et al. | |
| 4,303,924 A | 12/1981 | Young, Jr. | |
| 6,878,196 B2 * | 4/2005 | Harada et al. | 106/31.48 |
| 7,141,104 B2 * | 11/2006 | De Voeght et al. | 106/31.49 |
| 7,465,347 B2 * | 12/2008 | Kitamura et al. | 106/31.48 |
| 2003/0213405 A1 | 11/2003 | Harada et al. | |
| 2005/0168550 A1 * | 8/2005 | Deckers et al. | 347/100 |

FOREIGN PATENT DOCUMENTS

| | | |
|---|---|---|
| JP | 5-214279 A | 8/1993 |
| JP | 2001-512777 A | 8/2001 |
| WO | 99/07796 A1 | 2/1999 |
| WO | 03/010249 A1 | 2/2003 |
| WO | 2005/044924 A1 | 5/2005 |
| WO | 2007/012828 A2 | 2/2007 |

* cited by examiner

*Primary Examiner* — Sanza L McClendon
(74) *Attorney, Agent, or Firm* — Sughrue Mion, PLLC

(57) ABSTRACT

The invention provides a photo-curable composition that addresses degradation in dispersibility caused by the use of a pigment, and has good color tone and high light fastness. The photo-curable composition includes: a polymerizable compound; a polymerization initiator; and a dye represented by Formula (1):

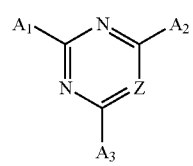

Formula (1)

in which, $A_1$, $A_2$ and $A_3$ each represent a monovalent group, and Z represents a nitrogen atom, an oxygen atom, a sulfur atom, or a monovalent group-bonded carbon atom, the dye represented by Formula (1) having two azo groups in a molecule thereof.

9 Claims, No Drawings

PHOTO-CURABLE COMPOSITION INCLUDING POLYMERIZABLE COMPOUND, POLYMERIZATION INITIATOR, AND DYE

CROSS-REFERENCE TO RELATED APPLICATION

This application claims priority under 35 USC 119 from Japanese Patent Application No. 2007-252490, the disclosure of which is incorporated by reference herein.

BACKGROUND OF THE INVENTION

1. Field of the Invention

The present invention relates to a photo-curable composition that includes a polymerizable compound, a polymerization initiator and a dye and that is curable with radiation.

2. Description of the Related Art

Aqueous ink compositions have low water resistance and may easily cause smearing, when printed on standard paper. Further, when printed on non-water absorbing recording materials such as plastics, aqueous ink compositions have also been known to promote deficiencies such as failure of image formation due to poor adhesion of ink droplets, the need for allowing the ink to dry, which prevents stacking of recording materials immediately after printing because of the extremely slow evaporation of the solvent of the ink, and smearing of images.

An ultraviolet-curable ink including a polyfunctional monomer having good adhesion to non-water absorbing recording materials has been proposed as a suitable ink composition for printing on non-water absorbing recording materials (see for example Japanese Patent Application National Publication (Laid-Open) No. 2001-512777). Since this ink is of a water dispersion type, however, it dries slowly and is insufficient for forming full-color images. To improve drying properties, volatile organic solvents have been used for the inks. For rapid drying, however, it is necessary to use a highly volatile solvent such as methyl ethyl ketone or ethanol as a main component.

In view of these problems, an inkjet recording ink has been proposed which is capable of being cured and fixed by radiation rather than by volatilization of ink solvents (see for example Japanese Patent Application Laid-Open (JP-A) No. 05-214279). Since this ink includes a pigment dispersion as a coloring component, it may cause nozzle clogging due to the agglomeration of the pigment, so that it may be difficult to maintain stable ink ejection.

When pigments are used as coloring materials, transparency may be reduced, or color tone may be insufficient, so that it may be difficult to obtain photographic image quality. In order to solve this problem, there is proposed an ultraviolet-curable ink using a dye as a coloring material (see U.S. Pat. No. 4,303,924). However, this ink may easily cause an undesirable polymerization reaction during storage, and therefore has the problem of insufficient storage stability. Further, when conventional dye compounds are used as alternatives to pigments, they have insufficient light fastness, and therefore the color of the dye may fade during or after curing. Moreover, since the ink also contains electrically-conductive salts, the solubility of the salts in the ink may sometimes be low so that printing defects may be caused by the precipitation of the salts after long-term storage.

SUMMARY OF THE INVENTION

According to the present invention, there is provided a photo-curable composition that addresses degradation in dispersibility caused by the use of a pigment, and that has good color tone and high light fastness.

The inventors of the present invention have found that the above problems may be addressed using an oil-soluble dye, which has an excellent light resistance, as a coloring material in place of a pigment.

According to an aspect of the present invention, there is provided a photo-curable composition, comprising:

a polymerizable compound;

a polymerization initiator; and a dye represented by Formula (1):

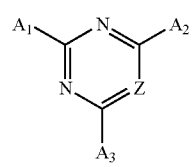

Formula (1)

wherein, $A_1$, $A_2$ and $A_3$ each independently represents a monovalent group, and Z represents a nitrogen atom, an oxygen atom, a sulfur atom, or a monovalent group-bonded carbon atom, the dye represented by Formula (1) having two azo groups.

According to another aspect of the present invention, the photo-curable composition of the invention is used for inkjet recording.

DETAILED DESCRIPTION OF THE INVENTION

The photo-curable composition of the invention includes a polymerizable compound, a polymerization initiator and a dye represented by Formula (1) shown below.

The photo-curable composition of the invention addresses degradation in dispersibility caused by the use of a pigment, and has good color tone and high light-fastness.

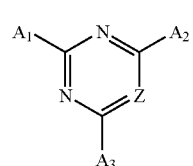

Formula (1)

The photo-curable composition of the invention is curable by application of a radiation. As used herein, "radiation" is not particularly limited as long as it may provide energy to produce initiating species in the composition irradiated with the radiation. Examples of a radiation that may be used in the invention include α rays, γ rays, X rays, ultraviolet rays, visible light, and electron beams. In view of curing sensitivity and ready availability of equipment, ultraviolet rays and electron beams are preferred, and ultraviolet rays are particularly preferred. Therefore, the photo-curable composition of the invention is preferably curable by application of ultraviolet rays.

Hereinafter, each of the components of the photo-curable composition of the invention will be described.

Dye

An azo dye represented by Formula (1) may be used in the invention. The dye represented by Formula (1) is described in detail hereinafter.

In Formula (1), $A_1$, $A_2$ and $A_3$ each independently represents a monovalent group. The monovalent group may be a hydrogen atom or a monovalent substituent. One or two selected from $A_1$, $A_2$ and $A_3$ may be a monovalent substituent containing an azo group, which will be described later.

The monovalent substituent is more specifically described hereinafter. Examples of the monovalent substituent include a halogen atom, an alkyl group, a cycloalkyl group, an aralkyl group, an alkenyl group, an alkynyl group, an aryl group, a heterocyclic group, a cyano group, a hydroxyl group, a nitro group, an alkoxy group, an aryloxy group, a silyloxy group, a heterocyclooxy group, an acyloxy group, a carbamoyloxy group, an alkoxycarbonyloxy group, an aryloxycarbonyloxy group, an amino group (such as an alkylamino group or an arylamino group), an acylamino group (such as an amido group), an aminocarbonylamino group (such as a ureido group), an alkoxycarbonylamino group, an aryloxycarbonylamino group, a sulfamoylamino group, an alkylsulfonylamino group, an arylsulfonylamino group, an alkylthio group, an arylthio group, a heterocyclothio group, a sulfamoyl group, an alkylsulfinyl group, an arylsulfinyl group, an alkylsulfonyl group, an arylsulfonyl group, an acyl group, an aryloxycarbonyl group, an alkoxycarbonyl group, a carbamoyl group, a phosphino group, a phosphinyl group, a phosphinyloxy group, a phosphinylamino group, a silyl group, an azo group, and an imido group. Each of the monovalent substituents may also have at least one substituent. The monovalent substituent is more specifically described hereinafter.

Examples of the halogen atom include a chlorine atom, a bromine atom and an iodine atom. Of those, a chlorine atom or a bromine atom is preferred, and a chlorine atom is particularly preferred.

The alkyl group may be a substituted or unsubstituted alkyl group. An example of the substituted or unsubstituted alkyl group is an alkyl group having 1 to 30 carbon atoms. Examples of the substituent of the substituted alkyl group include: a linear or branched alkyl group having 1 to 12 carbon atoms, a linear or branched aralkyl group having 7 to 18 carbon atoms, a linear or branched alkenyl group having 2 to 12 carbon atoms, a linear or branched alkynyl group having 2 to 12 carbon atoms, a linear or branched cycloalkyl group having 3 to 12 carbon atoms, and a linear or branched cycloalkenyl group having 3 to 12 carbon atoms (Among these groups, in terms of improving the solubility of the dye and the stability of ink, branched groups are preferred, and an asymmetric carbon-containing group is particularly preferred. Specific examples of such groups include methyl, ethyl, propyl, isopropyl, sec-butyl, tert-butyl, 2-ethylhexyl, 2-methylsulfonylethyl, 3-phenoxypropyl, trifluoromethyl, cyclopentyl); a halogen atom (such as a chlorine or bromine atom); an aryl group (such as phenyl, 4-tert-butylphenyl or 2,4-di-tert-amylphenyl); a heterocyclic group (such as imidazolyl, pyrazolyl, triazolyl, 2-furyl, 2-thienyl, 2-pyrimidinyl, or 2-benzothiazolyl); a cyano group; a hydroxyl group; a nitro group; an amino group; an alkyloxy group (such as methoxy, ethoxy, 2-methoxyethoxy, or 2-methylsulfonylethoxy); and aryloxy group (such as phenoxy, 2-methylphenoxy, 4-tert-butylphenoxy, 3-nitrophenoxy, 3-tert-butyloxycarbonylphenoxy, or 3-methoxycarbonylphenyloxy); an acylamino group (such as acetamido, benzamido or 4-(3-tert-butyl-4-hydroxyphenoxy)butanamido); an alkylamino group (such as methylamino, butylamino, diethylamino, or methylbutylamino); and arylamino group (such as phenylamino or 2-chloroanilino); a ureido group (such as phenylureido, methylureido or N,N-dibutylureido); a sulfamoylamino group (such as N,N-dipropylsulfamoylamino); an alkylthio group (such as methylthio, octylthio or 2-phenoxyethylthio); an arylthio group (such as phenylthio, 2-butoxy-5-tert-octylphenylthio, or 2-carboxyphenylthio); an alkyloxycarbonylamino group (such as methoxycarbonylamino); alkylsulfonylamino and arylsulfonylamino groups (such as methylsulfonylamino, phenylsulfonylamino or p-toluenesulfonylamino); a carbamoyl group (such as N-ethylcarbamoyl or N,N-dibutylcarbamoyl); a sulfamoyl group (such as N-ethylsulfamoyl, N,N-dipropylsulfamoyl or N-phenylsulfamoyl); a sulfonyl group (such as methylsulfonyl, octylsulfonyl, phenylsulfonyl, or p-toluenesulfonyl); an alkyloxycarbonyl group (such as methoxycarbonyl or butyloxycarbonyl); a heterocyclooxy group (such as 1-phenyltetrazol-5-oxy or 2-tetrahydropyranyloxy) an azo group (such as phenylazo, 4-methoxyphenylazo, 4-pivaloylaminophenylazo, or 2-hydroxy-4-propanoylphenylazo); an acyloxy group (such as acetoxy); a carbamoyloxy group (such as N-methylcarbamoyloxy or N-phenylcarbamoyloxy); a silyloxy group (such as trimethylsilyloxy or dibutylmethylsilyloxy); an aryloxycarbonylamino group (such as phenoxycarbonylamino); an imido group (such as N-succinimido or N-phthalimido); a heterocyclothio group (such as 2-benzothiazolylthio, 2,4-diphenoxy-1,3,5-triazole-6-thio or 2-pyridylthio); a sulfinyl group (such as 3-phenoxypropylsulfinyl); a phosphonyl group (such as phenoxyphosphonyl, octyloxyphosphonyl or phenylphosphonyl); an aryloxycarbonyl group (such as phenoxycarbonyl); an acyl group (such as acetyl, 3-phenylpropanoyl or benzoyl); and an ionic hydrophilic group (such as carboxyl, sulfo, phosphono, or quaternary ammonium).

The cycloalkyl group may be a substituted or unsubstituted cycloalkyl group. An example of the substituted or unsubstituted cycloalkyl group is preferably a cycloalkyl group having 5 to 30 carbon atoms. Examples of the substituent include the same substituents as those described above for the alkyl group. Examples of the cycloalkyl group include cyclohexyl, cyclopentyl and 4-n-dodecylcyclohexyl.

The aralkyl may be a substituted or unsubstituted aralkyl group. An example of the substituted or unsubstituted aralkyl is preferably an aralkyl group having 7 to 30 carbon atoms. Examples of the substituent include the same substituents as those described above for the alkyl group. Examples of the aralkyl group include benzyl and 2-phenethyl.

The alkenyl group may be a linear, branched or cyclic, substituted or unsubstituted alkenyl group. Examples of the alkenyl group preferably includes substituted or unsubstituted alkenyl groups having 2 to 30 carbon atoms, such as vinyl, allyl, prenyl, geranyl, oleyl, 2-cyclopenten-1-yl, or 2-cyclohexen-1-yl.

The alkynyl group may be a substituted or unsubstituted alkynyl group having 2 to 30 carbon atoms, and examples thereof include ethynyl and propargyl.

The aryl group may be a substituted or unsubstituted aryl group having 6 to 30 carbon atoms, and examples thereof include phenyl, p-tolyl, naphthyl, m-chlorophenyl, and o-hexadecanoylaminophenyl. Examples of the substituent include the same substituents as those described above for the alkyl group.

The heterocyclic group may be a monovalent group that corresponds to a five- or six-membered, substituted or unsubstituted, aromatic or non-aromatic, heterocyclic compound with one less hydrogen atom. Moreover the heterocyclic group may form a fused ring. The heterocyclic group is more preferably a five- or six-membered, aromatic heterocyclic group having 3 to 30 carbon atoms.

Examples of the substituent include the same substituents as those described above for the alkyl group. Examples of the heterocyclic group include pyridine, pyrazine, pyridazine, pyrimidine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isoxazole, benzisoxazole, pyrrolidine, piperidine, piperazine, imidazolidine, and thiazoline. In the examples, the substitution position is not particularly limited.

The alkoxy group may be a substituted or unsubstituted alkoxy group. An example of the substituted or unsubstituted alkoxy group is preferably an alkoxy group having 1 to 30 carbon atoms. Examples of the substituent include the same substituents as those described above for the alkyl group. Examples of the alkoxy group include methoxy, ethoxy, isopropoxy, n-octyloxy, methoxyethoxy, hydroxyethoxy, and 3-carboxypropoxy.

The aryloxy group may be preferably a substituted or unsubstituted aryloxy group having 6 to 30 carbon atoms. Examples of the substituent include the same substituents as those described above for the alkyl group. Examples of the aryloxy group include phenoxy, 2-methylphenoxy, 4-tert-butylphenoxy, 3-nitrophenoxy, and 2-tetradecanoylaminophenoxy.

The silyloxy group may be preferably a silyloxy group having 3 to 20 carbon atoms, and examples thereof include trimethylsilyloxy and tert-butyldimethylsilyloxy.

The heterocyclooxy group may be preferably a substituted or unsubstituted heterocyclooxy group having 2 to 30 carbon atoms. Examples of the substituent include the same substituents as those described above for the alkyl group. Examples of the heterocyclooxy group include 1-phenyltetrazol-5-oxy and 2-tetrahydropyranyloxy.

Examples of the acyloxy group include formyloxy, substituted or unsubstituted alkylcarbonyloxy having 2 to 30 carbon atoms, and substituted or unsubstituted arylcarbonyloxy having 6 to 30 carbon atoms. Examples of the substituent include the same substituents as those described above for the alkyl group. Specific examples of the acyloxy group include formyloxy, acetyloxy, pivaloyloxy, stearoyloxy, benzoyloxy, and p-methoxyphenylcarbonyloxy.

The carbamoyloxy group may be preferably a substituted or unsubstituted carbamoyloxy group having 1 to 30 carbon atoms. Examples of the substituent include the same substituents as those described above for the alkyl group. Examples of the carbamoyloxy group include N,N-dimethylcarbamoyloxy, N,N-diethylcarbamoyloxy, morpholinocarbonyloxy, N,N-di-n-octylaminocarbonyloxy, and N-n-octylcarbamoyloxy.

The alkoxycarbonyloxy group may be preferably a substituted or unsubstituted alkoxycarbonyloxy group having 2 to 30 carbon atoms. Examples of the substituent include the same substituents as those described above for the alkyl group. Examples of the alkoxycarbonyloxy group include methoxycarbonyloxy, ethoxycarbonyloxy, tert-butoxycarbonyloxy, and n-octylcarbonyloxy.

The aryloxycarbonyloxy group may be preferably a substituted or unsubstituted aryloxycarbonyloxy group having 7 to 30 carbon atoms. Examples of the substituent include the same substituents as those described above for the alkyl group. Examples of the aryloxycarbonyloxy group include phenoxycarbonyloxy, p-methoxyphenoxycarbonyloxy and p-n-hexadecyloxyphenoxycarbonyloxy.

The amino group is preferably a substituted or unsubstituted alkylamino group having 1 to 30 carbon atoms or a substituted or unsubstituted arylamino group having 6 to 30 carbon atoms. Examples of the substituent include the same substituents as those described above for the alkyl group. Examples of the amino group include amino, methylamino, dimethylamino, anilino, N-methyl-anilino, diphenylamino, hydroxyethylamino, carboxyethylamino, sulfoethylamino, and 3,5-dicarboxyanilino.

The acylamino group may be preferably a formylamino group, a substituted or unsubstituted alkylcarbonylamino group having 1 to 30 carbon atoms, or a substituted or unsubstituted arylcarbonylamino group having 6 to 30 carbon atoms. Examples of the substituent include the same substituents as those described above for the alkyl group. Examples of the acylamino group include formylamino, acetylamino, pivaloylamino, lauroylamino, benzoylamino, and 3,4,5-tri-n-octyloxyphenylcarbonylamino.

The aminocarbonylamino group may be preferably a substituted or unsubstituted aminocarbonylamino group having 1 to 30 carbon atoms. Examples of the substituent include the same substituents as those described above for the alkyl group. Examples of the aminocarbonylamino group include carbamoylamino, N,N-dimethylaminocarbonylamino, N,N-diethylaminocarbonylamino, and morpholinocarbonylamino.

The alkoxycarbonylamino group may be preferably a substituted or unsubstituted alkoxycarbonylamino group having 2 to 30 carbon atoms. Examples of the substituent include the same substituents as those described above for the alkyl group. Examples of the alkoxycarbonylamino group include methoxycarbonylamino, ethoxycarbonylamino, tert-butoxycarbonylamino, n-octadecyloxycarbonylamino, and N-methyl-methoxycarbonylamino.

The aryloxycarbonylamino group may be preferably a substituted or unsubstituted aryloxycarbonylamino group having 7 to 30 carbon atoms. Examples of the substituent include the same substituents as those described above for the alkyl group. Examples of the aryloxycarbonylamino group include phenoxycarbonylamino, p-chlorophenoxycarbonylamino and m-n-octyloxyphenoxycarbonylamino.

The sulfamoylamino group may be preferably a substituted or unsubstituted sulfamoylamino group having 0 to 30 carbon atoms. Examples of the substituent include the same substituents as those described above for the alkyl group. Examples of the sulfamoylamino group include sulfamoylamino, N,N-dimethylaminosulfonylamino and N-n-octylaminosulfonylamino.

Examples of the alkylsulfonylamino or arylsulfonylamino group preferably include a substituted or unsubstituted alkylsulfonylamino group having 1 to 30 carbon atoms and a substituted or unsubstituted arylsulfonylamino group having 6 to 30 carbon atoms. Examples of the substituent include the same substituents as those described above for the alkyl group. Specific examples of the alkylsulfonylamino or the arylsulfonylamino group include methylsulfonylamino, butylsulfonylamino, phenylsulfonylamino, 2,3,5-trichlorophenylsulfonylamino, and p-methylphenylsulfonylamino.

The alkylthio group may be preferably a substituted or unsubstituted alkylthio group having 1 to 30 carbon atoms. Examples of the substituent include the same substituents as those described above for the alkyl group. Examples of the alkylthio group include methylthio, ethylthio and n-hexadecylthio.

The arylthio may be preferably a substituted or unsubstituted arylthio group having 6 to 30 carbon atoms. Examples of the substituent include the same substituents as those described above for the alkyl group. Examples of the arylthio group include phenylthio, p-chlorophenylthio and m-methoxyphenylthio.

The heterocyclothio group may be preferably a substituted or unsubstituted heterocyclothio group having 2 to 30 carbon atoms. Examples of the substituent include the same substituents as those described above for the alkyl group. Examples of the heterocyclothio group include 2-benzothiazolylthio and 1-phenyltetrazol-5-ylthio.

The sulfamoyl group may be preferably a substituted or unsubstituted sulfamoyl group having 0 to 30 carbon atoms. Examples of the substituent include the same substituents as those described above for the alkyl group. Examples of the sulfamoyl group include N-ethylsulfamoyl, N-(3-dodecyloxypropyl)sulfamoyl, N,N-dimethylsulfamoyl, N-acetylsulfamoyl, N-benzoylsulfamoyl, and N-(N'-phenylcarbamoyl)sulfamoyl.

Examples of the alkylsulfinyl or arylsulfinyl group preferably includes a substituted or unsubstituted alkylsulfinyl having 1 to 30 carbon atoms and a substituted or unsubstituted arylsulfinyl having 6 to 30 carbon atoms. Examples of the substituent include the same substituents as those described above for the alkyl group. Examples of the alkylsulfinyl or the arylsulfinyl group include methylsulfinyl, ethylsulfinyl, phenylsulfinyl, and p-methylphenylsulfinyl.

Examples of the alkylsulfonyl or arylsulfonyl group preferably include a substituted or unsubstituted alkylsulfonyl group having 1 to 30 carbon atoms and a substituted or unsubstituted arylsulfonyl group having 6 to 30 carbon atoms. Examples of the substituent include the same substituents as those described above for the alkyl group. Examples of the alkylsulfonyl or arylsulfonyl group include methylsulfonyl, ethylsulfonyl, phenylsulfonyl, and p-toluenesulfonyl.

The acyl group may be preferably a formyl group, a substituted or unsubstituted alkylcarbonyl group having 2 to 30 carbon atoms, a substituted or unsubstituted arylcarbonyl group having 7 to 30 carbon atoms, or a heterocyclic carbonyl group which has 4 to 30 carbon atoms and in which a carbonyl group is bonded to a substituted or unsubstituted group including a heterocycle. Examples of the substituent include the same substituents as those described above for the alkyl group. Examples of the acyl group include acetyl, pivaloyl, 2-chloroacetyl, stearoyl, benzoyl, p-n-octyloxyphenylcarbonyl, 2-pyridylcarbonyl, and 2-furylcarbonyl.

The aryloxycarbonyl group may be preferably a substituted or unsubstituted aryloxycarbonyl group having 7 to 30 carbon atoms. Examples of the substituent include the same substituents as those described above for the alkyl group. Examples of the aryloxycarbonyl group include phenoxycarbonyl, o-chlorophenoxycarbonyl, m-nitrophenoxycarbonyl, and p-tert-butylphenoxycarbonyl.

The alkoxycarbonyl group may be preferably a substituted or unsubstituted alkoxycarbonyl group having 2 to 30 carbon atoms. Examples of the substituent include the same substituents as those described above for the alkyl group. Examples of the alkoxycarbonyl group include methoxycarbonyl, ethoxycarbonyl, tert-butoxycarbonyl, and n-octadecyloxycarbonyl.

The carbamoyl group may be preferably a substituted or unsubstituted carbamoyl group having 1 to 30 carbon atoms. Examples of the substituent include the same substituents as those described above for the alkyl group. Examples of the carbamoyl group include carbamoyl, N-methylcarbamoyl, N,N-dimethylcarbamoyl, N,N-di-n-octylcarbamoyl, and N-(methylsulfonyl)carbamoyl.

The phosphino group may be preferably a substituted or unsubstituted phosphino group having 2 to 30 carbon atoms. Examples of the substituent include the same substituents as those described above for the alkyl group. Examples of the phosphino group include dimethylphosphino, diphenylphosphino and methylphenoxyphosphino.

The phosphinyl group may be preferably a substituted or unsubstituted phosphinyl group having 2 to 30 carbon atoms. Examples of the substituent include the same substituents as those described above for the alkyl group. Examples of the phosphinyl group include phosphinyl, dioctyloxyphosphinyl and diethoxyphosphinyl.

The phosphinyloxy group may be preferably a substituted or unsubstituted phosphinyloxy group having 2 to 30 carbon atoms. Examples of the substituent include the same substituents as those described above for the alkyl group. Examples of the phosphinyloxy group include diphenoxyphosphinyloxy and dioctyloxyphosphinyloxy.

The phosphinylamino group may be preferably a substituted or unsubstituted phosphinylamino group having 2 to 30 carbon atoms. Examples of the substituent include the same substituents as those described above for the alkyl group. Examples of the phosphinylamino group include dimethoxyphosphinylamino and dimethylaminophosphinylamino.

The silyl group may be preferably a substituted or unsubstituted silyl group having 3 to 30 carbon atoms. Examples of the substituent include the same substituents as those described above for the alkyl group. Examples of the silyl group include trimethylsilyl, tert-butyldimethylsilyl and phenyldimethylsilyl.

Examples of the azo group include phenylazo, 4-methoxyphenylazo, 4-pivaloylaminophenylazo, and 2-hydroxy-4-propanoylphenylazo.

Examples of the imido include N-succinimido and N-phthalimido.

Z represents a nitrogen atom, an oxygen atom, a sulfur atom, or a monovalent group-bonded carbon atom. The monovalent group of the moiety Z may be the same as the substituent represented by $A_1$, $A_2$ or $A_3$.

The dye represented by Formula (1) may have two azo groups in a molecule thereof. This case includes (a) an aspect where the dye has, in a molecule thereof, a single monovalent substituent including two azo groups, and (b) another aspect where the dye has, in a molecule thereof, two monovalent substituents each including one azo group.

The monovalent substituent including one azo group and the monovalent substituent including two azo groups may each preferably be group including a heterocyclic ring and an azo group. Examples of such a heterocyclic ring include 5-pyrazolone ring, 5-aminopyrazole ring, oxazolone ring, barbituric acid ring, pyridone ring, rhodanine ring, pyrazolidinedione ring, pyrazolopyridone ring, and meldrum's acid ring. Of those, preferred are 5-pyrazolone ring and 5-aminopyrazole ring, and particularly preferred is 5-aminopyrazole ring.

The dye represented by Formula (1) may more preferably be represented by the following Formula (2). A detailed description is given of Formula (2) hereinafter.

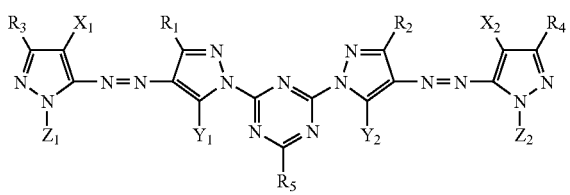

Formula (2)

In Formula (2), $Y_1$, $Y_2$, $Z_1$, $Z_2$, and $R_1$ to $R_5$ each represent a monovalent group. Examples of the monovalent group include a hydrogen atom and a monovalent substituent. Examples of the monovalent substituent are substantially the same as the substituents for $A_1$, $A_2$ and $A_3$ in Formula (1).

Examples of $R_1$ and $R_2$ include a substituted or unsubstituted alkyl group having 1 to 12 carbon atoms, a substituted or unsubstituted aryl group having 6 to 18 carbon atoms, and a substituted or unsubstituted heterocyclic group having 4 to 12 carbon atoms (hereinafter these substituents may be referred to as Group A substituents for $R_1$ and $R_2$ of Formula (2)). Among the Group A substituents, a linear or branched alkyl group having 1 to 8 carbon atoms (hereinafter such a substituent may be referred to as Group B substituents for $R_1$ and $R_2$ of Formula (2)) is preferred, and a secondary or tertiary alkyl group is particularly preferred, and a tert-butyl group is most preferred.

Examples of $R_3$ and $R_4$ include a hydrogen atom, a substituted or unsubstituted alkyl group having 1 to 12 carbon atoms, a substituted or unsubstituted aryl group having 6 to 18 carbon atoms, and a substituted or unsubstituted heterocyclic group having 4 to 12 carbon atoms (hereinafter these substituents may be referred to as Group A substituents for $R_3$ and $R_4$ of Formula (2)). Among the Group A substituents, a hydrogen atom and a linear or branched alkyl group having 1 to 8 carbon atoms (hereinafter these substituents may be referred to as Group B substituents for $R_3$ and $R_4$ of Formula (2)) are preferred, and a hydrogen atom or an alkyl group having 1 to 8 carbon atoms is particularly preferred, and a hydrogen atom is most preferred.

Examples of $R_5$ include a substituted or unsubstituted alkyl group having 1 to 12 carbon atoms, a substituted or unsubstituted aryl group having 6 to 18 carbon atoms, and a substituted or unsubstituted heterocyclic group having 4 to 12 carbon atoms, a halogen atom, an aryl group, a hydroxyl group, an amino group, an alkyloxy group, an aryloxy group, an acyloxy group, a carbamoyloxy group, a silyloxy group, and an ionic hydrophilic group (such as carboxyl, sulfo, phosphono, or quaternary ammonium) (hereinafter these substituents may be referred to as Group A substituents for $R_5$ of Formula (2)). Among the Group A substituents, hydroxyl, alkyloxy, aryloxy, acyloxy, and carbamoyloxy (hereinafter these substituents may be referred to as Group B substituents for $R_5$ of Formula (2)) are preferred, and hydroxyl, alkyloxy and aryloxy are particularly preferred, and alkyloxy is most preferred.

Examples of $Y_1$ and $Y_2$ include a hydroxyl group and an amino group (hereinafter these substituents may be referred to as Group A substituents for $Y_1$ and $Y_2$ of Formula (2)). Among the Group A substituents, an amino group is more preferred (hereinafter the substituent may be referred to as Group B substituents for $Y_1$ and $Y_2$ of Formula (2)).

Examples of $Z_1$ and $Z_2$ include a hydrogen atom, a substituted or unsubstituted alkyl group, a substituted or unsubstituted cycloalkyl group, a substituted or unsubstituted alkenyl group, a substituted or unsubstituted alkynyl group, a substituted or unsubstituted aralkyl group, a substituted or unsubstituted aryl group, and a substituted or unsubstituted heterocyclic group (hereinafter these substituents may be referred to as Group A substituents for $Z_1$ and $Z_2$ of Formula (2)). Among the Group A substituents, a substituted aryl group or a substituted heterocyclic group (hereinafter these substituents may be referred to as Group B substituents for $Z_1$ and $Z_2$ of Formula (2)) are preferred, and a substituted aryl group is particularly preferred.

In Formula (2), $X_1$ and $X_2$ each independently represents a monovalent electron-withdrawing group having a Hammett constant σp of 0.20 or more.

The electron-withdrawing group preferably has a Hammett substituent constant σp of 0.20 or more, and more preferably of 0.30 or more. The upper limit of the constant may be 1.0 or less.

The term "Hammett substituent constant σp" used herein will be briefly described. Hammett's rule is an empirical rule proposed by L. P. Hammett in 1935 to quantitatively describe the effect of substituents on the reactions or equilibrium of benzene derivatives. Its validity is now widely accepted. The substituent constants determined according to the Hammett's rule include σp constants and σm constants, and these constants may be found in many general textbooks. For example, the constants are described in detail in J. A. Dean Ed., Lange's Handbook of Chemistry, 12th Ed., 1979, McGraw-Hill, or in Kagaku no Ryoiki (extra issue) Vol. 122, pp. 96-103, 1979, Nankodo. Each substituent with a specific Hammett substituent constant σp defined or described herein is not intended to limit the substituents to values found in disclosed literature, such as the above textbooks, and any substituent with a value that is in the above range when measured according to Hammett's rule also falls within the scope of the invention, even if there is no literature showing the value. The dyes represented by Formulae (1) to (3) used in the invention are not benzene derivatives. However, the σp constant may be used as a scale of the electrical effect of substituents, regardless of the position of the substituents. Hereinafter in the invention, the σp constant is used for this purpose.

Specific examples of the monovalent electron-withdrawing group having an σp constant of 0.20 or more and represented by $X_1$ or $X_2$ include an acyl group, an acyloxy group, a carbamoyl group, an alkyloxycarbonyl group, an aryloxycarbonyl group, a cyano group, a nitro group, a dialkylphosphono group, a diarylphosphono group, a diarylphosphinyl group, an alkylsulfinyl group, an arylsulfinyl group, an alkylsulfonyl group, an arylsulfonyl group, a sulfonyloxy group, an acylthio group, a sulfamoyl group, a thiocyanate group, a thiocarbonyl group, a haloalkyl group, a haloalkoxy group, a haloaryloxy group, a haloalkylamino group, a haloalkylthio group, an aryl group substituted by any other electron-withdrawing group having an σp constant of 0.20 or more, a heterocyclic group substituted by any other electron-withdrawing group having an σp constant of 0.20 or more, a halogen atom, an azo group, and a selenocyanate group (hereinafter these substituents may be referred to as Group A substituents for $X_1$ and $X_2$ of Formula (2)).

Preferred examples of $X_1$ and $X_2$ include acyl having 2 to 12 carbon atoms, acyloxy having 2 to 12 carbon atoms, carbamoyl having 1 to 12 carbon atoms, alkyloxycarbonyl having 2 to 12 carbon atoms, aryloxycarbonyl having 7 to 18 carbon atoms, cyano, nitro, alkylsulfinyl having 1 to 12 carbon atoms, arylsulfinyl having 6 to 18 carbon atoms, alkylsulfonyl having 1 to 12 carbon atoms, arylsulfonyl having 6 to 18 carbon atoms, sulfamoyl having 0 to 12 carbon atoms, haloalkyl having 1 to 12 carbon atoms, haloalkyloxy having 1 to 12 carbon atoms, haloalkylthio having 1 to 12 carbon atoms, haloaryloxy having 7 to 18 carbon atoms, an aryl group that has 7 to 18 carbon atoms and is substituted by at least two other electron-withdrawing groups each having an σp constant of 0.20 or more, and a five- to eight-membered heterocyclic group that is substituted by at least two other electron-withdrawing groups each having an σp constant of 0.20 or more, and that has 1 to 18 carbon atoms, and that includes a nitrogen atom, an oxygen atom or a sulfur atom (hereinafter these substituents may be referred to as Group B substituents for $X_1$ and $X_2$ of Formula (2)).

More preferred examples of $X_1$ and $X_2$ include cyano, alkylsulfonyl having 1 to 12 carbon atoms, arylsulfonyl having 6 to 18 carbon atoms, and sulfamoyl having 0 to 12 carbon atoms.

Particularly preferred examples of $X_1$ and $X_2$ include cyano, alkylsulfonyl having 1 to 12 carbon atoms and sulfamoyl having 0 to 12 carbon atoms. Most preferred examples thereof include cyano and alkylsulfonyl having 1 to 12 carbon atoms.

In the invention, the substituents $X_1, X_2, Y_1, Y_2, Z_1, Z_2$, and $R_1$ to $R_5$ in Formula (2) may each be selected from the Group A substituents for $X_1, X_2, Y_1, Y_2, Z_1, Z_2$, and $R_1$ to $R_5$ in Formula (2), respectively, without any particular limitations. In an exemplary embodiment, at least one of $X_1, X_2, Y_1, Y_2, Z_1, Z_2$, and $R_1$ to $R_5$ in Formula (2) is preferably selected from the corresponding Group B substituents thereof. In another exemplary embodiment, three or more of $X_1, X_2, Y_1, Y_2, Z_1, Z_2$, and $R_1$ to $R_5$ in Formula (2) are each preferably selected from the corresponding Group B substituents thereof. In another exemplary embodiment, all of $X_1, X_2, Y_1, Y_2, Z_1, Z_2$, and $R_1$ to $R_5$ in Formula (2) are each preferably selected from the corresponding Group B substituents thereof.

The dye represented by Formula (1) is more preferably represented by the following Formula (3). A detailed description is given of Formula (3) hereinafter.

ents may be referred to as Group B substituents for $R_5$ to $R_8$ of Formula (3)) are more preferred, and carboxyl, aryloxycarbonyl and alkoxycarbonyl are particularly preferred. Alkoxycarbonyl is most preferred. From the viewpoints of easily attaining excellent oil solubility or excellent light fastness, the substituent preferably has an ester structure.

Examples of the substituents of $Y_1$ and $Y_2$ are each independently the same as the substituents of $Y_1$ and $Y_2$ in Formula (2) described above.

Examples of the substituent W include a hydrogen atom, a substituted or unsubstituted alkyl group having 1 to 12 carbon atoms, a substituted or unsubstituted aryl group having 6 to 18 carbon atoms, a substituted or unsubstituted heterocyclic group having 4 to 12 carbon atoms, an acyl group, a carbamoyl group, and a silyl group (hereinafter these substituents may be referred to as Group A substituents for W of Formula (3)).

Among the Group A substituents, a hydrogen atom, substituted or unsubstituted alkyl having 1 to 12 carbon atoms, and substituted or unsubstituted aryl having 6 to 18 carbon atoms are preferred (hereinafter these substituents may be referred to as Group B substituents for W of Formula (3)), and a hydrogen atom and substituted or unsubstituted alkyl having 1 to 12 carbon atoms are particularly preferred. Substituted or unsubstituted alkyl having 1 to 12 carbon atoms is most preferred.

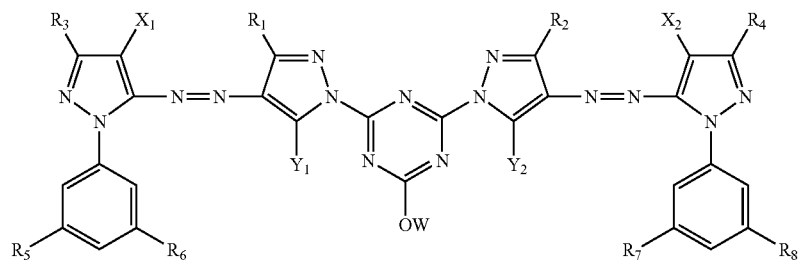

Formula (3)

In Formula (3), W, $Y_1, Y_2$, and $R_1$ to $R_8$ each represent a monovalent group. Examples of the monovalent group include a hydrogen atom and a monovalent substituent. Examples of the monovalent substituent are the same as those of $A_1, A_2$ and $A_3$ in Formula (1).

Examples of the substituents of $R_1$ and $R_2$ are each independently the same as the substituents of $R_1$ and $R_2$ in Formula (2) described above, and preferred examples are also the same.

Examples of the substituents $R_3$ and $R_4$ are each independently the same as the substituents of $R_3$ and $R_4$ in Formula (2) described above, and preferred examples are also the same.

Examples of the substituents of $R_5$ to $R_8$ include a halogen atom, carboxyl, acylamino (such as amide), aminocarbonylamino (such as ureido), alkoxycarbonylamino, aryloxycarbonylamino, sulfamoylamino, alkylsulfonylamino, arylsulfonylamino, sulfamoyl, alkylsulfinyl, arylsulfinyl, alkylsulfonyl, arylsulfonyl, aryloxycarbonyl, alkoxycarbonyl, and carbamoyl (hereinafter these substituents may be referred to as Group A substituents for $R_5$ to $R_8$ of Formula (3)).

Among the Group A substituents, carboxyl, alkylsulfinyl, arylsulfinyl, alkylsulfonyl, arylsulfonyl, aryloxycarbonyl, alkoxycarbonyl, and carbamoyl (hereinafter these substitu- $X_1$ and $X_2$ each independently represent a monovalent electron-withdrawing group. Examples thereof are the same as those of $X_1$ and $X_2$ in Formula (2), and preferred examples are also the same.

The substituents $X_1, X_2, W, Y_1, Y_2$, and $R_1$ to $R_8$ in Formula (3) may each be selected from the Group A substituents for $X_1, X_2, W, Y_1, Y_2$, and $R_1$ to $R_8$ in Formula (3), respectively, without any particular limitations. In an exemplary embodiment, at least one of $X_1, X_2, W, Y_1, Y_2$, and $R_1$ to $R_8$ in Formula (3) is preferably selected from the corresponding Group B substituents thereof. In another exemplary embodiment, three or more of $X_1, X_2, W, Y_1, Y_2$, and $R_1$ to $R_8$ in Formula (3) are each preferably selected from the corresponding Group B substituents thereof. In an exemplary embodiment, all of $X_1, X_2, W, Y_1, Y_2$, and $R_1$ to $R_8$ in Formula (3) are each more preferably selected from the corresponding Group B substituents thereof.

The amount of the dye in the photo-curable composition is preferably from 0.05 to 20% by mass, more preferably from 0.1 to 15% by mass, particularly preferably from 0.2 to 6% by mass.

Examples of the dyes represented by Formulae (1), (2) and (3) for use in the invention include, but are not limited to, the dyes (exemplary dyes DYE-1 to DYE-22) shown below.

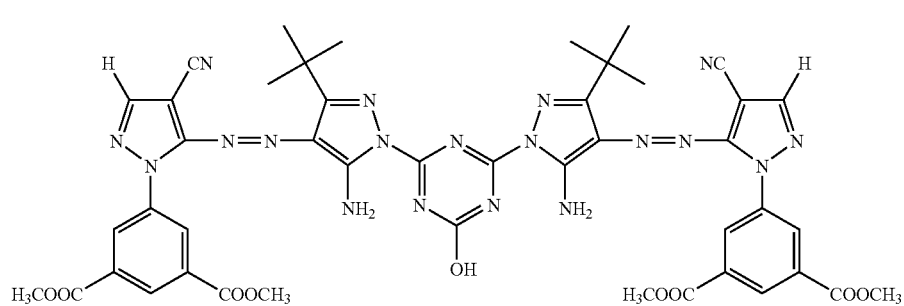
DYE-1
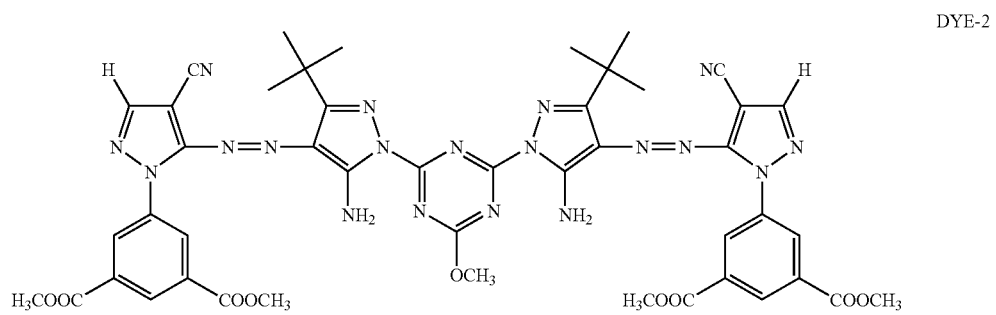
DYE-2
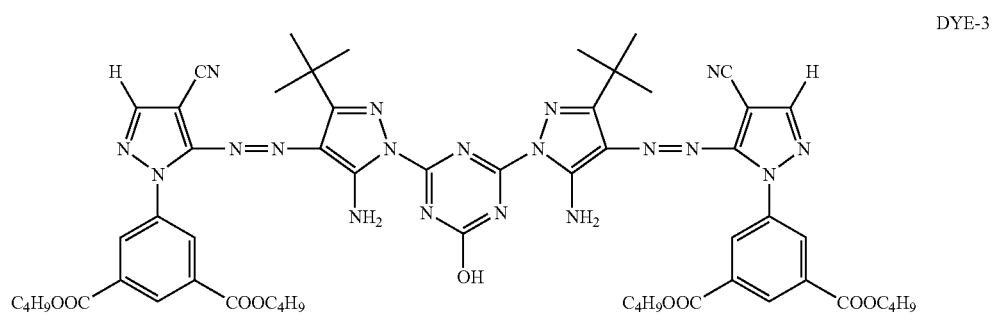
DYE-3
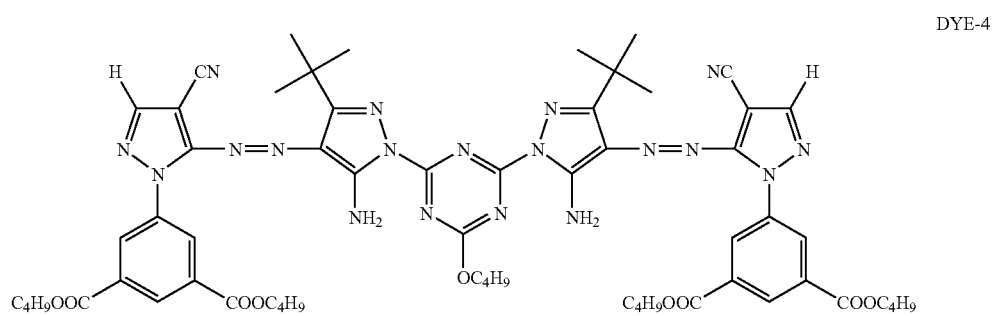
DYE-4
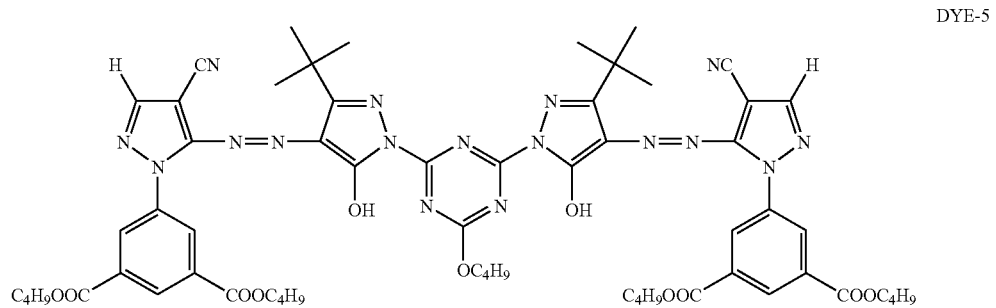
DYE-5

-continued
DYE-6
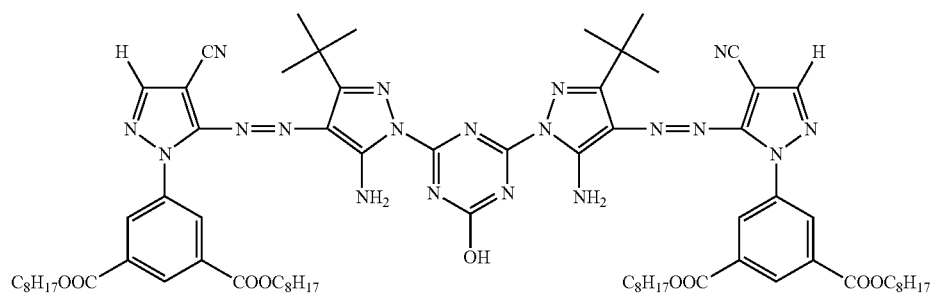
DYE-7
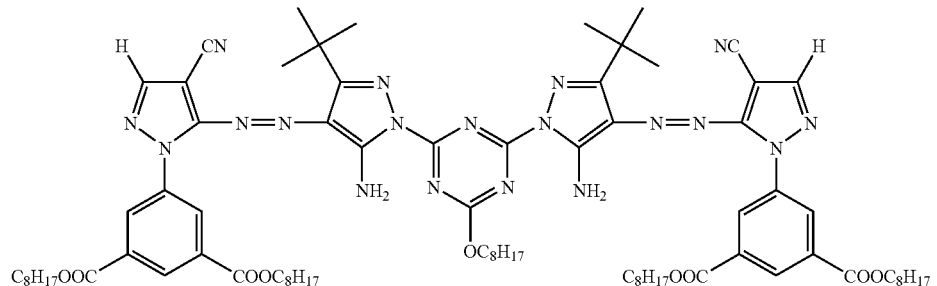
DYE-8
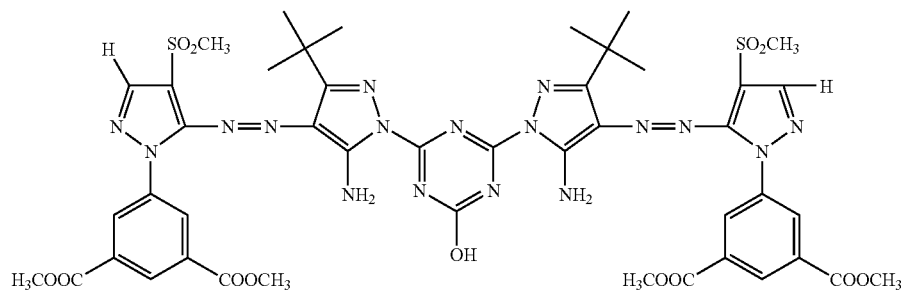
DYE-9
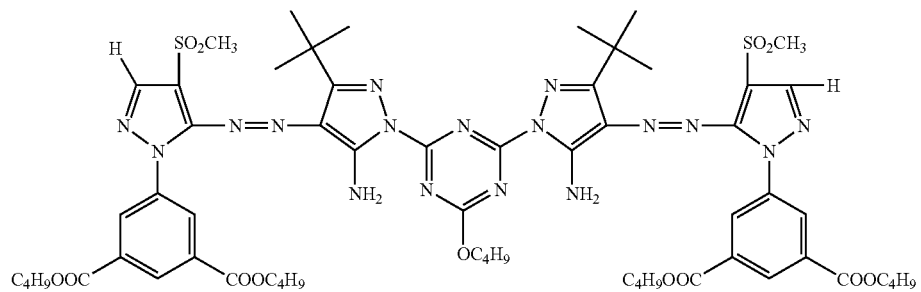
DYE-10
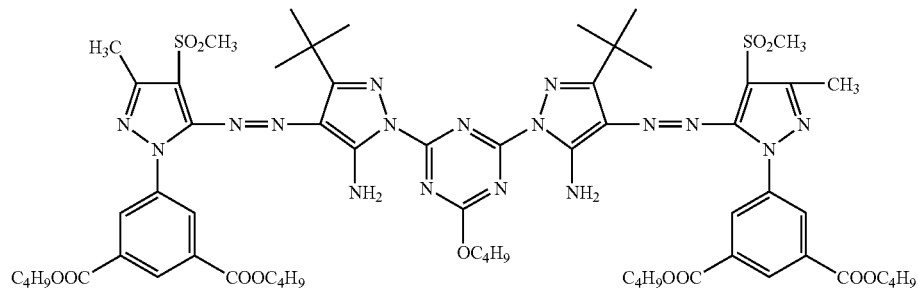

-continued
DYE-11
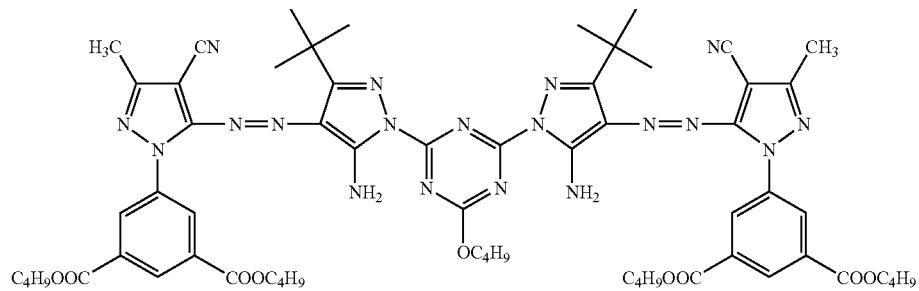
DYE-12
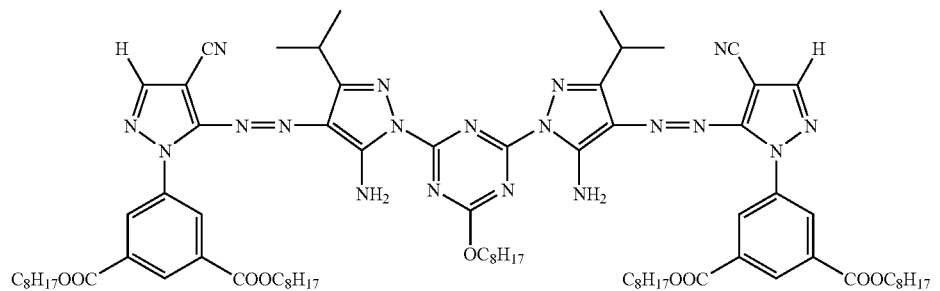
DYE-13
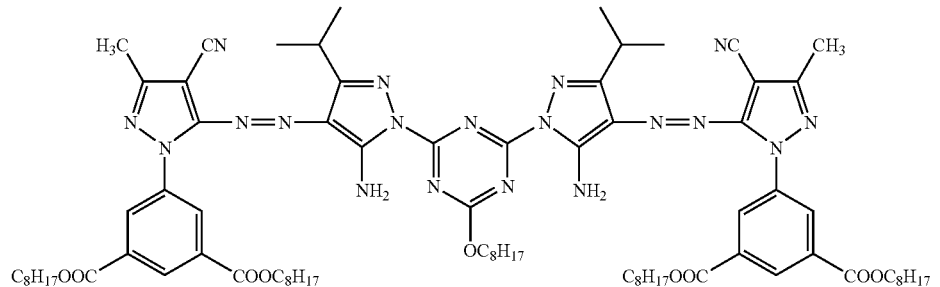
DYE-14
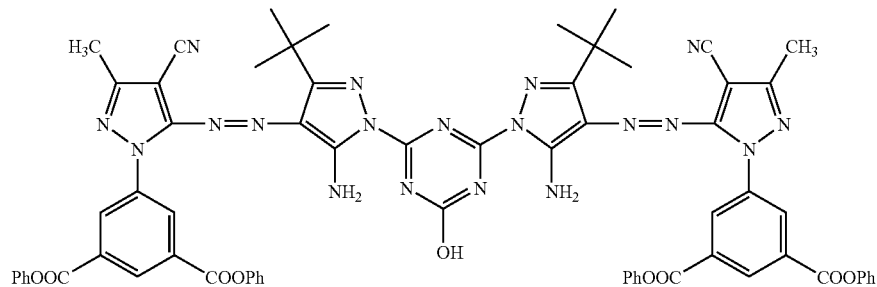
DYE-15
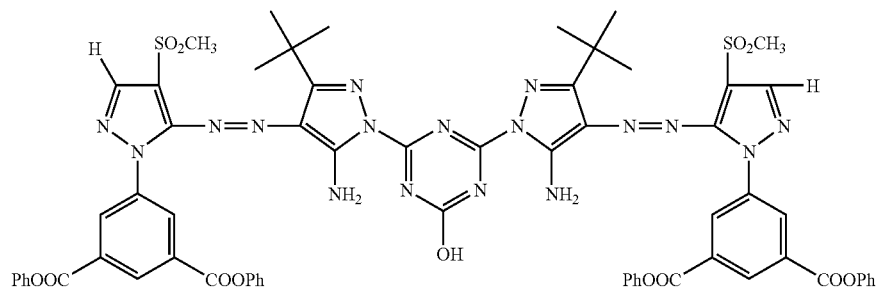

-continued
DYE-16
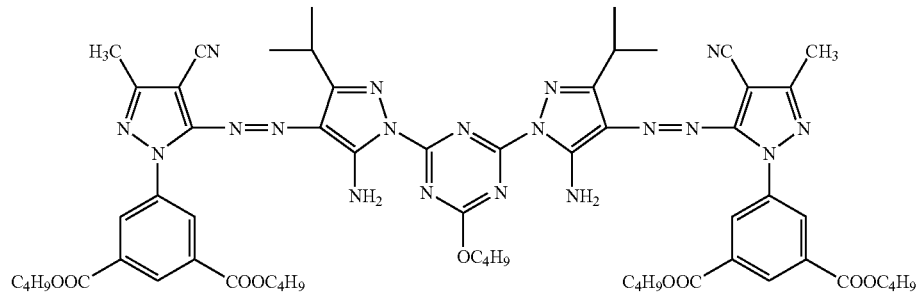
DYE-17
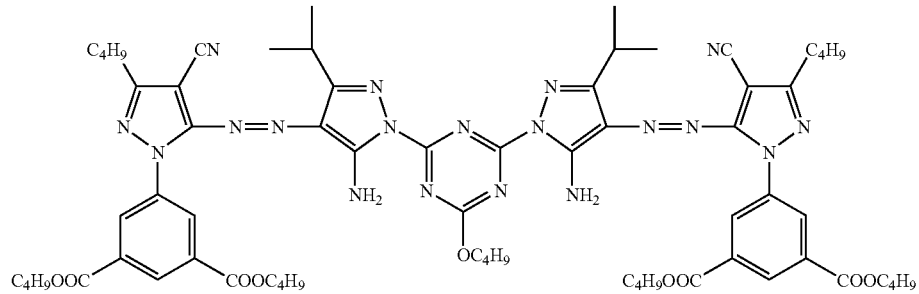
DYE-18
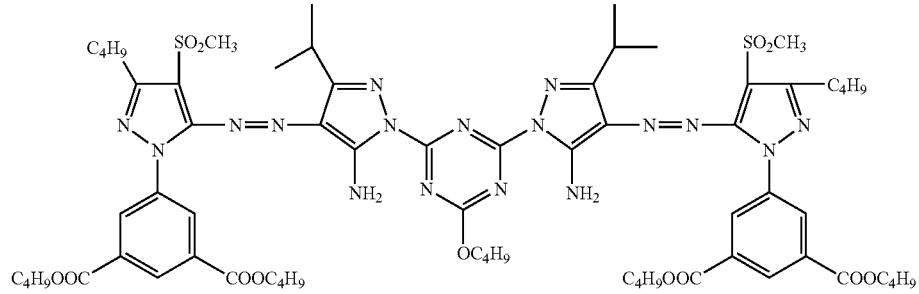
DYE-19
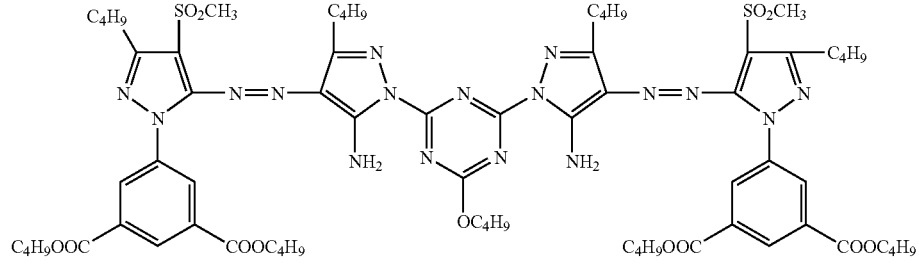
DYE-20
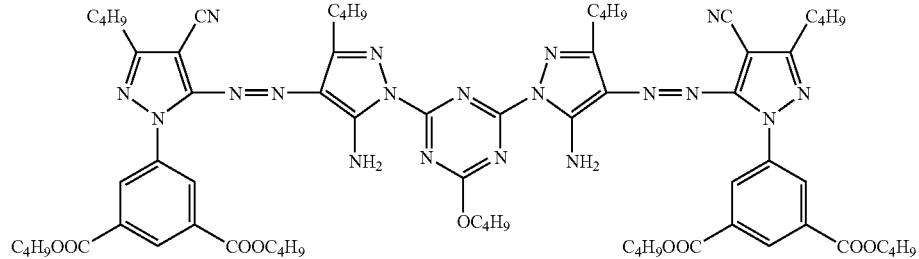

-continued

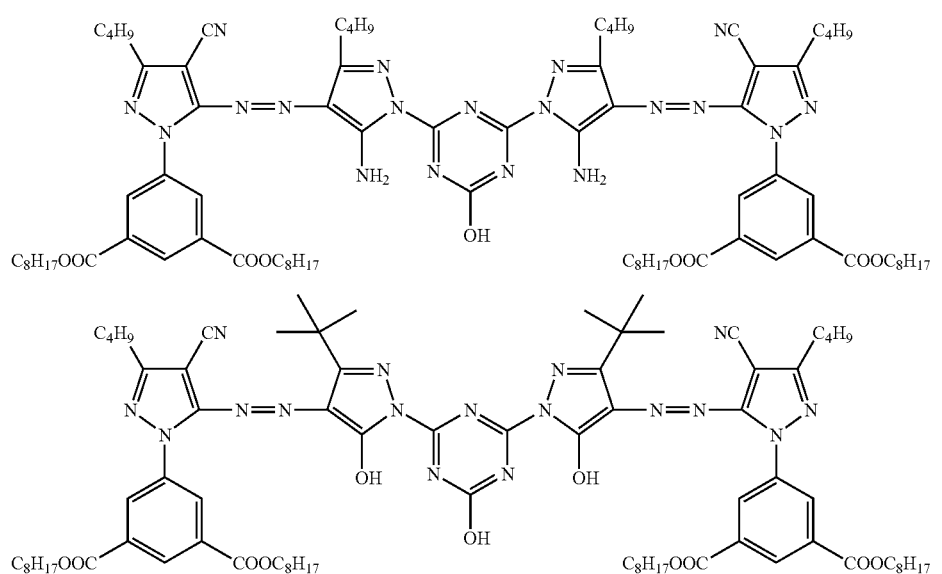

Polymerizable Compounds

The photo-curable composition of the invention includes a polymerizable compound such as a cationically polymerizable compound or a radically-polymerizable compound.

Cationically Polymerizable Compounds

The cationically polymerizable compound that may be used in the invention is preferably a compound that start to polymerize and cure in the presence of an acid generated from a compound that generates acid by irradiation with a radiation and capable of being cured. Various known cationically polymerizable monomers known as a photo-cationically polymerizable compound may be used. Examples of the cationically polymerizable compounds include the epoxy compounds, the vinyl ether compounds and the oxetane compounds disclosed in JP-A Nos. 06-9714, 2001-31892, 2001-40068, 2001-55507, 2001-310938, 2001-310937, and 2001-220526.

Examples of the epoxy compounds include aromatic epoxides and alicyclic epoxides.

The aromatic epoxides may be, for example, di- or poly-glycidyl ethers prepared in reaction of a polyvalent phenol having at least one aromatic ring or the alkyleneoxide adduct thereof with epichlorohydrin. Example of the epoxy compounds include di- or poly-glycidyl ethers of bisphenol A or the alkyleneoxide adduct thereof, di- or poly-glycidyl ethers of a hydrogenated bisphenol A or the alkyleneoxide adduct thereof, novolak epoxy resins, and the like. Examples of the alkyleneoxide include ethyleneoxide and propyleneoxide.

Preferable examples of the alicyclic epoxides include compounds including cyclohexene oxide or cyclopentene oxide prepared through epoxidation of a compound having at least one cycloalkane ring such as a cyclohexene or cyclopentene ring with an appropriate oxidant such as hydrogen peroxide or peroxy acid.

Examples of the aliphatic epoxide include diglycidyl or polyglycidyl ethers of aliphatic polyhydric alcohols or alkylene oxide adducts thereof, and typical examples thereof include diglycidyl ethers of alkylene glycols such as diglycidyl ether of ethylene glycol, diglycidyl ether of propylene glycol, and diglycidyl ether of 1,6-hexanediol, polyglycidyl ethers of polyhydric alcohols such as diglycidyl or triglycidyl ether of glycerol or alkylene oxide adducts thereof, diglycidyl ethers of polyalkylene glycols such as diglycidyl ether of polyethylene glycol or alkylene oxide adducts thereof, and diglycidyl ether of polypropylene glycol or alkylene oxide adducts thereof. Examples of the alkylene oxide include ethylene oxide and propylene oxide.

The monofunctional and polyfunctional epoxy compounds for use in the invention will be described in detail hereinafter.

Examples of the monofunctional epoxy compounds include phenyl glycidylether, p-tert-butylphenyl glycidylether, butyl glycidylether, 2-ethylhexyl glycidylether, allyl glycidylether, 1,2-butyleneoxide, 1,3-butadienemonooxide, 1,2-epoxydodecane, epichlorohydrin, 1,2-epoxydecane, styreneoxide, cylcohexeneoxide, 3-methacryloyloxymethylcylcohexeneoxide, 3-acryloyloxymethylcylcohexeneoxide, and 3-vinylcylcohexeneoxide.

Examples of the multifunctional epoxy compounds include bisphenol A diglycidylether, bisphenol F diglycidylether, bisphenol S diglycidylether, brominated bisphenol A diglycidylether, brominated bisphenol F diglycidylethers, brominated bisphenol S diglycidylether, epoxy novolak resins, hydrogenated bisphenol A diglycidylethers, hydrogenated bisphenol F diglycidylethers, hydrogenated bisphenol S diglycidylethers, 3,4-epoxycyclohexylmethyl-3',4'-epoxycyclohexanecarboxylate, 2-(3,4-epoxycyclohexyl-5,5-spiro-3,4-epoxy)cyclohexane-meta-dioxane, bis(3,4-epoxycyclohexylmethyl)adipate, vinylcylcohexeneoxide, 4-vinylepoxycyclohexane, bis(3,4-epoxy-6-methylcyclohexylmethyl)adipate, 3,4-epoxy-6-methylcyclohexyl-3',4'-epoxy-6'-methylcyclohexanecarboxylate, methylene-bis(3,4-epoxycyclohexane), dicyclopentadiene diepoxide, ethylene glycol di(3,4-epoxycyclohexylmethyl)ether, ethylene bis(3,4-epoxycyclohexanecarboxylate), epoxyhexahydrodioctyl phthalate, epoxyhexahydrodi-2-ethylhexyl phthalate, 1,4-butanediol diglycidylether, 1,6-hexanediol diglycidylether, glycerol triglycidylether, trimethylolpropane triglycidylether, polyethylene glycol diglycidylether, polypropylene glycol diglycidylether, 1,1,3-tetradecadienedioxide, limonenedioxide, 1,2,7,8-diepoxyoctane, and 1,2,5,6-diepoxycyclooctane.

Among the epoxy compounds, aromatic and alicyclic epoxides are preferable from the viewpoint of curing speed, and alicyclic epoxides are particularly preferable.

Examples of the vinyl ether compounds include di- or tri-vinyl ether compounds such as ethylene glycol divinyl ether, diethylene glycol divinyl ether, triethylene glycol divinyl ether, propylene glycol divinyl ether, dipropylene glycol divinyl ether, butanediol divinyl ether, hexanediol divinyl ether, cyclohexanedimethanol divinyl ether, or trimethylolpropane trivinylether; and monovinylether compounds such as ethyl vinylether, n-butyl vinylether, isobutyl vinylether, octadecyl vinylether, cyclohexyl vinylether, hydroxybutyl vinylether, 2-ethylhexyl vinylether, cyclohexanedimethanol monovinylether, n-propyl vinylether, isopropyl vinylether, isopropenylether-O-propylene carbonate, dodecyl vinylether, diethylene glycol monovinylether, or octadecyl vinylether.

Hereinafter, examples of the monofunctional and multifunctional vinyl ethers will be described in detail.

Examples of the monofunctional vinylethers include methyl vinylether, ethyl vinylether, propyl vinylether, n-butyl vinylether, t-butyl vinylether, 2-ethylhexyl vinylether, n-nonyl vinylether, lauryl vinylether, cyclohexyl vinylether, cyclohexylmethyl vinylether, 4-methylcyclohexylmethyl vinylether, benzyl vinylether, dicyclopentenyl vinylether, 2-dicyclopentenoxyethyl vinylether, methoxyethyl vinylether, ethoxyethyl vinylether, butoxyethyl vinylether, methoxyethoxyethyl vinylether, ethoxyethoxyethyl vinylether, methoxypolyethylene glycol vinylether, tetrahydrofurfuryl vinylether, 2-hydroxyethyl vinylether, 2-hydroxypropyl vinylether, 4-hydroxybutyl vinylether, 4-hydroxymethylcyclohexylmethyl vinylether, diethylene glycol monovinylether, polyethylene glycol vinylether, chloroethyl vinylether, chlorobutyl vinylether, chloroethoxyethyl vinylether, phenylethyl vinylether, and phenoxypolyethylene glycol vinylether.

Examples of the multifunctional vinylethers include divinyl ethers such as ethylene glycol divinyl ether, diethylene glycol divinyl ether, polyethylene glycol divinyl ether, propylene glycol divinyl ether, butylene glycol divinyl ether, hexanediol divinyl ether, bisphenol A alkyleneoxide divinyl ethers, or bisphenol F alkyleneoxide divinyl ethers; and multifunctional vinyl ethers such as trimethylolethane trivinylether, trimethylolpropane trivinylether, ditrimethylolpropane tetravinylether, glycerol trivinylether, pentaerythritol tetravinylether, dipentaerythritol pentavinylether, dipentaerythritol hexavinylether, ethyleneoxide adducts of trimethylolpropane trivinylether, propyleneoxide adducts of trimethylolpropane trivinylether, ethyleneoxide adducts of ditrimethylolpropane tetravinylether, propyleneoxide adducts of ditrimethylolpropane tetravinylether, ethyleneoxide adducts of pentaerythritol tetravinylether, propyleneoxide adducts of pentaerythritol tetravinylether, ethyleneoxide adducts of dipentaerythritol hexavinylether, or propyleneoxide adducts of dipentaerythritol hexavinylether.

Di- or tri-vinylether compounds are preferable as the vinyl ether compounds, from the viewpoints of curing efficiency, adhesiveness to a recording medium, and the surface hardness of a formed image; and divinyl ether compounds are particularly preferable.

Any appropriate oxetane compound may be selected from known oxetane compounds such as those disclosed in JP-A Nos. 2001-220526, 2001-310937 and 2003-341217 and used in the invention. An oxetane ring-containing compound that may be used in photo-curable composition of the invention preferably has one to four oxetane rings in the structure thereof. The use of such a compound facilitates keeping the viscosity of the composition within a range where excellent handleability may be provided.

Examples of the compounds that have one or two oxetane rings in a molecule thereof and may be used in the photo-curable composition of the invention include the compounds represented by the following Formulae (1) to (3).

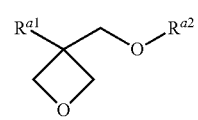

(1)

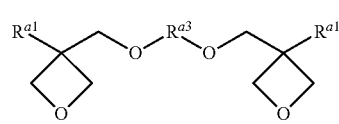

(2)

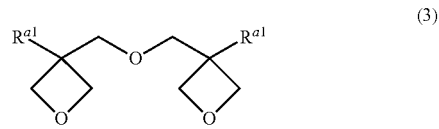

(3)

$R^{a1}$ represents a hydrogen atom, an alkyl group having 1 to 6 carbon atoms, a fluoroalkyl group having 1 to 6 carbon atoms, an allyl group, an aryl group, a furyl group, or a thienyl group. In cases where two $R^{a1}$s are present in the molecule, they may be the same as or different from each other.

Examples of the alkyl group include a methyl group, an ethyl group, a propyl group, and a butyl group, and any of hydrogen atoms in these alkyl groups may be substituted by a fluorine atom, which are preferable as the fluoroalkyl group.

$R^{a2}$ represents a hydrogen atom, an alkyl group having 1 to 6 carbon atoms, an alkenyl group having 2 to 6 carbon atoms, an aromatic ring-containing group, an alkylcarbonyl group having 2 to 6 carbon atoms, an alkoxycarbonyl group having 2 to 6 carbon atoms, or an N-alkylcarbamoyl group having 2 to 6 carbon atoms. Examples of the alkyl group include a methyl group, an ethyl group, a propyl group, and a butyl group. Examples of the alkenyl group include a 1-propenyl group, a 2-propenyl group, a 2-methyl-1-propenyl group, a 2-methyl-2-propenyl group, a 1-butenyl group, a 2-butenyl group, and a 3-butenyl group. Examples of the aromatic ring-containing group include a phenyl group, a benzyl group, a fluorobenzyl group, a methoxybenzyl group, and a phenoxyethyl group. Examples of the alkylcarbonyl group include an ethylcarbonyl group, a propylcarbonyl group, and a butylcarbonyl group. Examples of the alkoxycarbonyl group include an ethoxycarbonyl group, a propoxycarbonyl group, and a butoxycarbonyl group. Examples of the N-alkylcarbamoyl group include an ethylcarbamoyl group, a propylcarbamoyl group, a butylcarbamoyl group, and a pentylcarbamoyl group. $R^{a2}$ may be optionally substituted, and examples of the substituent include an alkyl group having 1 to 6 carbon atoms, and a fluorine atom.

$R^{a3}$ represents a linear or branched alkylene group, a linear or branched unsaturated hydrocarbon group, a carbonyl group or a carbonyl group-containing alkylene group, a carboxyl group-containing alkylene group, a carbamoyl group-containing alkylene group, or a group shown below. Examples of the alkylene groups include ethylene, propylene, and butylene groups; and examples of the poly(alkyleneoxy) groups include poly(ethyleneoxy) and poly(propyleneoxy) groups. Examples of the unsaturated hydrocarbon groups include propenylene, methylpropenylene, and butenylene groups.

$$-CH_2-\underset{\underset{R^{a4}}{|}}{\underset{|}{\bigcirc}}-CH_2-$$

$$-CH_2-\underset{R^{a5}}{\underset{|}{\bigcirc}}-CH_2-$$

$$-(CH_2)_3-\underset{\underset{R^{a6}}{|}}{\overset{R^{a6}}{Si}}-O-(\underset{\underset{R^{a7}}{|}}{\overset{R^{a7}}{Si}}-O)_n-\underset{\underset{R^{a6}}{|}}{\overset{R^{a6}}{Si}}-(CH_2)_3-$$

In cases where $R^{a3}$ is one of the above-described polyvalent groups, $R^{a4}$ represents a hydrogen atom, an alkyl group having 1 to 4 carbon atoms, an alkoxy group having 1 to 4 carbon atoms, a halogen atom, a nitro group, a cyano group, a mercapto group, a lower alkyl carboxyl group, a carboxyl group, or a carbamoyl group.

$R^{a5}$ represents an oxygen atom, a sulfur atom, a methylene group, NH, SO, $SO_2$, $C(CF_3)_2$, or $C(CH_3)_2$.

$R^{a6}$ represents an alkyl group having 1 to 4 carbon atoms, or an aryl group, and n is an integer of 0 to 2,000. $R^{a7}$ represents an alkyl group having 1 to 4 carbon atoms, an aryl group, or a monovalent group having the structure shown below. In the following formula, $R^{a8}$ represents an alkyl group having 1 to 4 carbon atoms or an aryl group, and m is an integer of 0 to 100.

$$-O-(\underset{\underset{R^{a8}}{|}}{\overset{R^{a8}}{Si}}-O)_m-\underset{\underset{R^{a8}}{|}}{\overset{R^{a8}}{Si}}-R^{a8}$$

Examples of the compounds represented by Formula (1) include 3-ethyl-3-hydroxymethyloxetane (OXT-101: manufactured by Toagosei Co., Ltd.), 3-ethyl-3-(2-ethylhexyloxymethyl)oxetane (OXT-212: manufactured by Toagosei Co., Ltd.), and 3-ethyl-3-phenoxymethyloxetane (OXT-211: manufactured by Toagosei Co., Ltd.). Examples of the compounds represented by Formula (2) include 1,4-bis[(3-ethyl-3-oxetanylmethoxy)methyl]benzene (OXT-121: Toagosei Co., Ltd. In addition, examples of the compounds represented by Formula (3) include bis(3-ethyl-3-oxetanylmethyl)ether (OXT-221: Toagosei Co., Ltd.).

Examples of the compounds having 3 or 4 oxetane rings include the compounds represented by the following Formula (4).

$$\left[\begin{array}{c} R^{a1} \\ \diamond \\ O \end{array} - O \right]_j - R^{a9} \quad (4)$$

In Formula (4), $R^{a1}$ is the same as that in Formula (1) above. Examples of the polyvalent connecting group $R^{a9}$ include branched alkylene groups having 1 to 12 carbon atoms such as the groups represented by the following groups A to C, branched poly(alkyleneoxy) groups such as the groups represented by the following group D, and branched polysiloxy groups such as the group represented by the following group E. j is 3 or 4.

A
$$R^{a10}-C\begin{pmatrix} CH_2- \\ CH_2- \\ CH_2- \end{pmatrix}$$

B
$$-CH_2-C\begin{pmatrix} CH_2- \\ CH_2- \\ CH_2- \end{pmatrix}$$

C
$$-CH_2-CH_2-CH-CH_2-CH-CH_2-CH_2-$$

D
$$-(CH_2CH_2O)_p-CH_2-\underset{\underset{CH_2-(OCH_2CH_2)_p}{|}}{\overset{CH_2-(OCH_2CH_2)_p}{|}}-CH_2CH_3$$

E
$$-CH_2-\underset{\underset{CH_2}{|}}{\overset{CH_3}{CH}}-CH_2-\underset{\underset{CH_3}{|}}{\overset{CH_3}{Si}}-O-\underset{\underset{CH_3}{|}}{\overset{CH_3}{Si}}-CH_2-\underset{\underset{CH_2-}{|}}{CH}-CH_2-$$

In the group A, $R^{a10}$ represents a methyl, ethyl or propyl group. In the group D, p is an integer of 1 to 10.

Other examples of the oxetane compounds favorably used in the invention include compounds represented by the following Formula (5) having oxetane rings on the side chains thereof.

$$R^{a11}-O-\left[\begin{array}{c} R^{a8} \\ | \\ Si-O \\ | \\ (CH_2)_3 \\ | \\ O \\ \diamond \\ O \end{array}\right]_r - R^{a11} \quad (5)$$

In Formula (5), $R^{a1}$ is the same as that in Formula (1), and $R^{a8}$ is the same as that in the above formula. $R^{a11}$ represents an alkyl group having 1 to 4 carbon atoms or a trialkylsilyl group such as a methyl group, an ethyl group, a propyl group, or a butyl group, and r is an integer of 1 to 4.

Such oxetane ring-containing compounds are disclosed in detail in paragraphs [0021] to [0084] of JP-A No. 2003-341217, which are also preferably used in the invention.

The oxetane compound disclosed in JP-A No. 2004-91556 may also be used together in the invention. The compound is described in detail in paragraphs [0022] to [0058] of the publication.

Other oxetane compounds that may be used together in the invention preferably have one oxetane ring from the viewpoints of the viscosity and adhesive properties of the composition.

When the cationically polymerizable compound is used in the photo-curable composition of the invention, the amount of the cationically polymerizable compound is preferably 60% by mass or more, more preferably 70% by mass or more, with respect to the total solid content of the photo-curable composition. The upper limit of the amount of the cationically polymerizable compound is preferably 95% by mass or less.

The cationically polymerizable compound preferably has a cationically polymerizable monofunctional monomer in an amount of 50% by mass or more, more preferably of 60% by mass or more. The amount of the cationically polymerizable monofunctional monomer in the above range is effective in improving the flexibility of a cured film.

Radically-Polymerizable Compounds

A radically-polymerizable compound as used herein may be a compound having a radically-polymerizable ethylenically-unsaturated bond, and any compound that has at least one radically-polymerizable ethylenically unsaturated bond in a molecule thereof may be used as the radically-polymerizable compound for the photo-curable composition of the invention. The chemical form of the radically-polymerizable compound may be a monomer, an oligomer, a polymer, or the like. Only a single radically-polymerizable compound may be used, or two or more radically-polymerizable compounds may be used together in any appropriate ratio for improving the desired properties. Two or more of radically-polymerizable compounds are preferably used in combination in order to control properties such as reactivity and physical properties.

Examples of the polymerizable compounds having a radically-polymerizable ethylenically-unsaturated bond include radically-polymerizable compounds such as: unsaturated carboxylic acids such as acrylic acid, methacrylic acid, itaconic acid, crotonic acid, isocrotonic acid or maleic acid and salts thereof; anhydrides having an ethylenically-unsaturated group; acrylonitrile; styrene; various unsaturated polyesters; unsaturated polyethers; unsaturated polyamides; or unsaturated urethanes.

Specific examples thereof include: acrylic acid derivatives such as 2-ethylhexyl acrylate, 2-hydroxyethyl acrylate, butoxyethyl acrylate, carbitol acrylate, cyclohexyl acrylate, tetrahydrofurfuryl acrylate, benzyl acrylate, bis(4-acryloxypolyethoxyphenyl)propane, neopentylglycol diacrylate, 1,6-hexanediol diacrylate, ethyleneglycol diacrylate, diethyleneglycol diacrylate, triethyleneglycoldiacrylate, tetraethyleneglycol diacrylate, polyethyleneglycol diacrylate, polypropyleneglycol diacrylate, pentaerythritol triacrylate, pentaerythritol tetraacrylate, dipentaerythritol tetraacrylate, trimethylolpropane triacrylate, tetramethylolmethane tetraacrylate, oligoester acrylate, N-methylol acrylamide, diacetone acrylamide, or epoxyacrylate; methacrylic acid derivatives such as methyl methacrylate, n-butyl methacrylate, 2-ethylhexyl methacrylate, lauryl methacrylate, allyl methacrylate, glycidyl methacrylate, benzyl methacrylate, dimethylaminomethyl methacrylate, 1,6-hexanediol dimethacrylate, ethyleneglycol dimethacrylate, triethyleneglycoldimethacrylate, polyethyleneglycol dimethacrylate, polypropyleneglycol dimethacrylate, trimethylolethane trimethacrylate, trimethylolpropane trimethacrylate, or 2,2-bis(4-methacryloxypolyethoxyphenyl)propane; and allyl compound derivatives such as allyl glycidyl ether, diallyl phthalate, or triallyl trimellitate. Further specifically, commercially available or well known in the industry, radically-polymerizable or crosslinkable monomers, oligomers and polymers described in "Crosslinking Agent Handbook" edited by Shinzo Yamashita (1981, Taiseisha); "UV•EB Curing Handbook (ingredient part)" edited by Kiyoshi Kato (1985, Koubunshikankoukai); P. 79 in "Application and Market of UV•EB curing technique" edited by RadTech Japan (1989, CMC); "Polyester Resin Handbook" written by Eiichiro Takiyama (1988, The Nikkan Kogyo Shinbun, Ltd.) or the like, may be used.

Examples of the radically-polymerizable compounds further include materials of photo-curable polymerizable compounds used for the photopolymerizable composition disclosed in each of JP-A Nos. 07-159983, Japanese Patent Application Publication (JP-B) No. 07-31399, and JP-A Nos. 08-224982, 10-863 and 09-134011. These materials may also be used for the photo-curable composition of the invention.

It is preferable that vinyl ether compounds may also be used as the radically-polymerizable compounds. Examples of the vinyl ether compounds that are preferably used include divinyl or trivinyl ether compounds such as ethylene glycol divinyl ether, ethylene glycol monovinyl ether, diethylene glycol divinyl ether, triethylene glycol monovinyl ether, triethylene glycol divinyl ether, propylene glycol divinyl ether, dipropylene glycol divinyl ether, butanediol divinyl ether, hexanediol divinyl ether, cyclohexanedimethanol divinyl ether, hydroxyethyl monovinyl ether, hydroxynonyl monovinyl ether, or trimethylolpropane trivinyl ether; and monovinyl ether compounds such as ethyl vinyl ether, n-butyl vinyl ether, isobutyl vinyl ether, octadecyl vinyl ether, cyclohexyl vinyl ether, hydroxybutyl vinyl ether, 2-ethylhexyl vinyl ether, cyclohexanedimethanol monovinyl ether, n-propyl vinyl ether, isopropyl vinyl ether, isopropenyl ether-O-propylene carbonate, dodecyl vinyl ether, diethylene glycol monovinyl ether, or octadecyl vinyl ether.

Among the vinyl ether compounds, divinyl ether compounds and trivinyl ether compounds are preferred, and divinyl ether compounds are particularly preferred, from the viewpoints of curing efficiency, adhesiveness and surface hardness. One vinyl ether compound may be used alone, or an appropriate combination of two or more vinyl ether compounds may be used.

When a radically-polymerizable compound is used in the photo-curable composition of the invention, the amount of the radically-polymerizable compound is preferably 60% by mass or more, more preferably 70% by mass or more. The upper limit of the addition amount of the radically-polymerizable compound is preferably 95% by mass or less.

Polymerization Initiator

The photo-curable composition of the invention also includes a polymerization initiator. The polymerization initiator preferably includes a compound that generates an acid upon irradiation with a radiation. In the invention, an acid generated by irradiation with radiation induces the polymerization reaction and curing of the polymerizable compound.

The polymerization initiator for use in the photo-curable composition of the invention may be appropriately selected from photopolymerization initiators for photo-cationic polymerization, photopolymerization initiators for photo-radical polymerization, a photo-decoloring agent or a color-changing agent for dyes, and compounds that generate acid upon irradiation with radiations such as light to be applied to micro resists or the like (such as ultraviolet rays of 200 nm to 400 nm or far ultraviolet rays, particularly preferably g-line, h-line, i-line, or KrF excimer laser beams), ArF excimer laser beams, electron beams, X rays, molecular beams, or ion beams.

Examples of the polymerization initiators include onium salt compounds such as diazonium salts, phosphonium salts, sulfonium salts and iodonium salts and sulfonate compounds such as imidosulfonates, oxime sulfonates, diazodisulfones, disulfones, and o-nitrobenzyl sulfonates that decompose and generate acid by irradiation with a radiation, and the like.

Examples of other compounds that generate an acid upon irradiation with active rays or radiations (polymerization initiators) which may be used in the invention include: onium salts such as diazonium salts as disclosed in S. I. Schlensinger, Photogr. Sci. Eng., 18, 387 (1974) and T. S. Bal et al., Polymer, 21, 423 (1980), ammonium salts as disclosed in U.S. Pat. Nos. 4,069,055 and 4,069,056, U.S. Pat. No. Reissue 27,992, and JP-A No. 03-140140, phosphonium salts as disclosed in D. C. Necker et al., Macromolecules, 17, 2468 (1984), C. S. Wen et al., Teh, Proc. Conf. Rad. Curing, ASIA, p. 478, Tokyo, October (1988), and U.S. Pat. Nos. 4,069,055 and 4,069,056, iodonium salts as disclosed in J. V. Crivello et al., Macromolecules, 10 (6), 1307 (1977), Chem. & Eng. News, November 28, p. 31 (1988), European Patent Nos. 104,143, 339,049 and 410,201, and JP-A Nos. 02-150848 and 02-296514, sulfonium salts as disclosed in J. V. Crivello et al., Polymer J., 17, 73 (1985), J. V. Crivello et al., J. Org. Chem., 43, 3055 (1978), W. R. Watt et al., J. Polymer Sci., Polymer Chem. Ed., 22, 1789 (1984), J. V. Crivello et al., Polymer Bull., 14, 279 (1985), J. V. Crivello et al., Macromolecules, 14 (5), 1141 (1981), J. V. Crivello et al., J. Polymer Sci., Polymer Chem. Ed., 17, 2877 (1979), European Patent Nos. 370,693, 161, 811, 410,201, 339,049, 233,567, 297,443, and 297,442, U.S. Pat. Nos. 3,902,114, 4,933,377, 4,760,013, 4,734,444, and 2,833,827, German Patent Nos. 2,904,626, 3,604,580 and 3,604,581, and JP-A Nos. 07-28237 and 08-27102, selenonium salts as disclosed in J. V. Crivello et al., Macromolecules, 10 (6), 1307 (1977) and J. V. Crivello et al., J. Polymer Sci., Polymer Chem. Ed., 17, 1047 (1979), and arsonium salts as disclosed in C. S. Wen et al., Teh, Proc. Conf. Rad. Curing ASIA, p. 478, Tokyo, October (1988);

organic halogen compounds as disclosed in U.S. Pat. No. 3,905,815, JP-B No. 46-4605, JP-A Nos. 48-36281, 55-32070, 60-239736, 61-169835, 61-169837, 62-58241, 62-212401, 63-70243, and 63-298339; organic metal/organic halides as disclosed in K. Meier et al., J. Rad. Curing, 13 (4), 26 (1986), T. P. Gill et al., Inorg. Chem., 19, 3007 (1980), D. Astruc, Acc. Chem. Res., 19 (12), 377 (1986), and JP-A No. 02-161445;

o-nitrobenzyl protective group-containing polymerization initiators as disclosed in S. Hayase et al., J. Polymer Sci., 25, 753 (1987), E. Reichmanis et al., J. Polymer Sci., Polymer Chem. Ed., 23, 1 (1985), Q. Q. Zhu et al., J. Photochem., 36, 85, 39, 317 (1987), B. Amit et al., Tetrahedron Lett., (24) 2205 (1973), D. H. R. Barton et al., J. Chem. Soc., 3571 (1965), P. M. Collins et al., J. Chem. Soc., Perkin I, 1695 (1975), M. Rudinstein et al., Tetrahedron Lett., (17), 1445 (1975), J. W. Walker et al., J. Am. Chem. Soc., 110, 7170 (1988), S. C. Busman et al., J. Imaging Technol., 11 (4), 191 (1985), H. M. Houlihan et al., Macromolecules, 21, 2001 (1988), P. M. Collins et al., J. Chem. Soc., Chem. Commun., 532 (1972), S. Hayase et al., Macromolecules, 18, 1799 (1985), E. Reichmanis et al., J. Electrochem. Soc., Solid State Sci. Technol., 130 (6), F. M. Houlihan et al., Macromolecules, 21, 2001 (1988), European Patent Nos. 0,290,750, 046,083, 156,535, 271,851, and 0,388,343, U.S. Pat. Nos. 3,901,710 and 4,181, 531, and JP-A No. 60-198538 and 53-133022;

compounds that are photo-decomposed and generate sulfonic acid, such as iminosulfonates as disclosed in M. TUNOOKA et al., Polymer Preprints, Japan, 35 (8), G. Berner et al., J. Rad. Curing, 13 (4), W. J. Mijs et al, Coating Technol., 55 (697), 45 (1983), Akzo, H. Adachi et al., Polymer Preprints, Japan, 37 (3), European Patent Nos. 0,199,672, 84,515, 044,115, 618,564, and 0,101,122, U.S. Pat. Nos. 4,371,605 and 4,431,774, and JP-A Nos. 64-18143, 02-245756 and 03-140109; disulfone compounds as disclosed in JP-A Nos. 61-166544 and 02-71270; and diazoketosulfone compounds and diazodisulfone compounds as disclosed in JP-A Nos. 03-103854, 03-103856 and 04-210960.

Compounds obtained by introducing a group or compound that generates an acid by the light rays into the main or side chain of polymers may also be used, examples of the compounds are disclosed in M. E. Woodhouse et al., J. Am. Chem. Soc., 104, 5586 (1982), S. P. Pappas et al., J. Imaging Sci., 30 (5), 218 (1986), S. Kondo et al., Makromol. Chem., Rapid Commun., 9, 625 (1988), Y Yamada et al., Makromol. Chem., 152, 153, 163 (1972), J. V. Crivello et al., J. Polymer Sci., Polymer Chem. Ed., 17, 3845 (1979), U.S. Pat. No. 3,849, 137, German Patent No. 3,914,407, JP-A Nos. 63-26653, 55-164824, 62-69263, 63-146038, 63-163452, 62-153853, and 63-146029. Specific examples thereof include: onium salts such as diazonium salts, ammonium salts, phosphonium salts, iodonium salts, sulfonium salts, selenonium salts, or arsonium salts; organic halogen compounds; organic metal/ organic halides; o-nitrobenzyl protective group-containing polymerization initiators; compounds that are photo-decomposed and generate sulfonic acid, such as iminosulfonates; disulfone compounds; diazoketosulfone compounds; and diazodisulfone compounds.

Other examples include compounds that generate an acid by light described in V. N. R. Pillai, Synthesis, (1), 1 (1980), A. Abad et al, Tetrahedron Lett., (47) 4555 (1971), D. H. R. Barton et al, J. Chem. Soc., (C), 329 (1970), U.S. Pat. No. 3,779,778, and European Patent No. 126,712 and the like.

In the invention, the compounds represented by the following Formulae (b1), (b2) and (b3) may each be preferably used as the polymerization initiator.

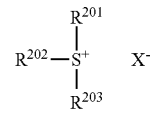

(b1)

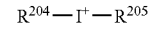

(b2)

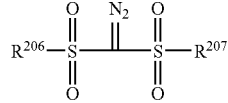

(b3)

In Formula (b1), $R^{201}$, $R^{202}$ and $R^{203}$ each independently represent an organic group.

$X^-$ represents a non-nucleophilic anion, examples of which include a sulfonate anion, a carboxylate anion, a bis(alkylsulfonyl)amide anion, a tris(alkylsulfonyl)methide anion, $BF_4^-$, $PF_6^-$, $SbF_6^-$, and the groups shown below. Carbon atom-containing organic anions are preferred.

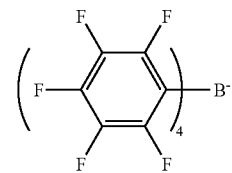

Examples of the organic anions preferably includes those represented by the following formulae.

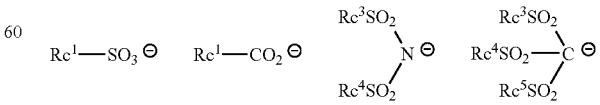

$Rc^1$ represents an organic group.

The organic group represented by $Rc^1$ may have 1 to 30 carbon atoms and is preferably an alkyl group, a cycloalkyl group, an aryl group, or a group including two or more of these groups joined by a single bond or a linking group such as —O—, —CO$_2$—, —S—, —SO$_3$—, or —SO$_2$N(Rd$^1$)—.

Rd$^1$ represents a hydrogen atom or an alkyl group.

Rc$^3$, Rc$^4$ and Rc$^5$ each independently represent an organic group.

Examples of the organic groups represented by Rc$^3$, Rc$^4$ and Rc$^5$ is preferably the same as those of the organic group represented by Rc$^1$, and a perfluoroalkyl group having 1 to 4 carbon atoms is most preferred.

Rc$^3$ and Rc$^4$ may be bonded to form a ring.

Rc$^3$ and Rc$^4$ may be bonded to form a group such as an alkylene group or an arylene group, or preferably a perfluoroalkylene group having 2 to 4 carbon atoms.

Each of the organic groups represented by R$^{c1}$, and R$^{c3}$ to R$^{c5}$ is most preferably an alkyl group substituted by a fluorine atom or fluoroalkyl group at the 1 position, or a phenyl group substituted by a fluorine atom or a fluoroalkyl group. Through the fluorine atom or fluoroalkyl group increases the acidity of the acid generated by photoirradiation, thereby improving the sensitivity.

The organic group represented by R$^{201}$, R$^{202}$ or R$^{203}$ generally has 1 to 30 carbon atoms, preferably 1 to 20 carbon atoms.

Two of R$^{201}$, R$^{202}$ and R$^{203}$ may be bonded to form a ring structure which may include an oxygen atom, a sulfur atom, an ester bond, an amide bond, or a carbonyl group. Two of R$^{201}$, R$^{202}$ and R$^{203}$ may be joined to form a group such as an alkylene group (such as butylene or pentylene).

Specific examples of the organic groups represented by R$^{201}$, R$^{202}$ and R$^{203}$ include those corresponding to the groups in Compounds (b1-1), (b1-2) and (b1-3) described later.

The compound may include a plurality of the structure represented by Formula (b1). For example, at least one of R$^{201}$ to R$^{203}$ of the compound represented by Formula (b1) may be bonded to at least one of R$^{201}$ to R$^{203}$ of another compound represented by Formula (b1) directly or through a linking group.

Preferable examples of the (b1) component include the following compounds (b1-1), (b1-2), and (b1-3) described below.

The compound (b1-1) is an arylsulfonium compound in which at least one of R$^{201}$ to R$^{203}$ of Formula (b1) is an aryl group, that is, a compound in which the cation thereof is an aryl sulfonium.

In the arylsulfonium compound, all of R$^{201}$ to R$^{203}$ may be an aryl group, or a part of R$^{201}$ to R$^{203}$ may be an aryl group, with the remainder being an alkyl group or a cycloalkyl group.

Examples of the arylsulfonium compounds include triarylsulfonium compounds, diarylalkylsulfonium compounds, aryldialkylsulfonium compounds, diarylcycloalkylsulfonium compounds, and aryldicycloalkylsulfonium compounds.

The aryl group in the arylsulfonium compounds is preferably an aryl group such as phenyl or naphthyl, or a heteroaryl group such as indole or pyrrole, and more preferably a phenyl or indole residue. When the arylsulfonium compound has two or more aryl groups, the two or more aryl groups may be the same as or different from each other.

The alkyl group that the arylsulfonium compound may have as needed is preferably a linear or branched alkyl group having 1 to 15 carbons, and examples thereof include methyl, ethyl, propyl, n-butyl, sec-butyl, and t-butyl groups.

The cycloalkyl group that the arylsulfonium compound may have as needed is preferably a cycloalkyl group having 3 to 15 carbons, and examples thereof include cyclopropyl, cyclobutyl, and cyclohexyl groups.

The aryl group, alkyl group, and cycloalkyl group of R$^{201}$ to R$^{203}$ may each have an alkyl group (for example, one having 1 to 15 carbon atoms), a cycloalkyl group (for example, one having 3 to 15 carbon atoms), an aryl group (for example, one having 6 to 14 carbon atoms), an alkoxy group (for example, one having 1 to 15 carbon atoms), a halogen atom, a hydroxyl group, or a phenylthio group as a substituent. Examples of the substituent preferably include a linear or branched alkyl group having 1 to 12 carbon atoms, a cycloalkyl group having 3 to 12 carbon atoms, and a linear, branched, or cyclic alkoxy group having 1 to 12 carbon atoms, with an alkyl group having 1 to 4 carbon atoms and an alkoxy group having 1 to 4 carbon atoms being most preferable. The substituent may replace any one of R$^{201}$ to R$^{203}$, or all of R$^{201}$ to R$^{203}$. Also, in cases where R$^{201}$ to R$^{203}$ each represent an aryl group, it is preferable that the substituent replace the p-position of the aryl group.

Hereinafter, the compound (b1-2) will be described.

The compound (b1-2) is a compound represented by Formula (b1), wherein R$^{201}$ to R$^{203}$ each independently represent a non-aromatic ring-containing organic group. The aromatic rings include aromatic rings including a heteroatom.

The non-aromatic ring-containing organic group of R$^{201}$ to R$^{203}$ generally has 1 to 30 carbon atoms and preferably 1 to 20 carbon atoms. R$^{201}$ to R$^{203}$ each independently, preferably represent an alkyl, cycloalkyl, allyl, or vinyl group, more preferably a linear, branched, or cyclic 2-oxoalkyl group or alkoxycarbonylmethyl group, and particularly preferably a linear or branched 2-oxoalkyl group.

The alkyl group of R$^{201}$ to R$^{203}$ may be linear or branched, and is preferably a linear or branched alkyl group having 1 to 10 carbon atoms (for example, a methyl group, an ethyl group, a propyl group, a butyl group, and a pentyl group), and more preferably a linear or branched 2-oxoalkyl group or alkoxycarbonylmethyl group.

The cycloalkyl group of R$^{201}$ to R$^{203}$ is preferably a cycloalkyl group having 3 to 10 carbon atoms (for example, a cyclopentyl group, a cyclohexyl group, and a norbornyl group), and more preferably a cyclic 2-oxoalkyl group.

Examples of the linear, branched, or cyclic 2-oxoalkyl group of R$^{201}$ to R$^{203}$ preferably include a group having >C=O at the 2-position of the above-described alkyl group or cycloalkyl group.

Examples of the alkoxy group in the alkoxycarbonylmethyl group of R$^{201}$ to R$^{203}$ preferably include an alkoxy group having 1 to 5 carbon atoms (for example, a methoxy group, an ethoxy group, a propoxy group, a butoxy group, and a pentoxy group).

R$^{201}$ to R$^{203}$ may be further substituted by a halogen atom, an alkoxy group (for example, one having 1 to 5 carbon atoms), a hydroxy group, a cyano group, or a nitro group.

The compound (b1-3) is a compound represented by the following Formula (b1-3), i.e., a compound having a phenacyl sulfonium salt structure.

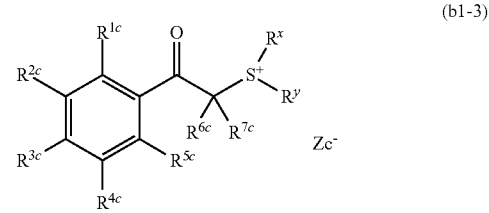

(b1-3)

In Formula (b1-3), $R^{1c}$ to $R^{5c}$ each independently represent a hydrogen atom, an alkyl group, a cycloalkyl group, an alkoxy group, or a halogen atom.

$R^{6c}$ and $R^{7c}$ each independently represent a hydrogen atom, an alkyl group, or a cycloalkyl group.

$R^x$ and $R^y$ each independently represent an alkyl group, a cycloalkyl group, an allyl group, or a vinyl group.

Any two or more of $R^{1c}$ to $R^{5c}$ may be bonded together to form a ring structure. $R^{6c}$ and $R^{7c}$ may be bonded together to form a ring structure. $R^x$ and $R^y$ may be bonded together to form a ring structure. $Zc^-$ represents a non-nucleophilic anion, and may be the same as the non-nucleophilic anion of $X^-$ in Formula (b1).

The alkyl group of $R^{1c}$ to $R^{7c}$ may be a linear or branched group, and examples thereof include linear or branched alkyl groups having 1 to 20 carbon atoms, preferably having 1 to 12 carbon atoms (for example, methyl, ethyl, linear or branched propyl, linear or branched butyl, and linear or branched pentyl).

The cycloalkyl group of $R^{1c}$ to $R^{7c}$ is preferably a cycloalkyl group having 3 to 8 carbon atoms (for example, a cyclopentyl group, and a cyclohexyl group).

The alkoxy group of $R^{1c}$ to $R^{5c}$ may be a linear, branched, or cyclic group, and examples thereof include alkoxy groups having 1 to 10 carbons, preferably, linear or branched alkoxy groups having 1 to 5 carbons (for example, methoxy, ethoxy, linear or branched propoxy, linear or branched butoxy, and linear or branched pentoxy groups), and cyclic alkoxy groups having 3 to 8 carbons (for example, cyclopentyloxy and cyclohexyloxy groups).

Examples of the groups formed by binding of any two or more of $R^{1c}$ to $R^{5c}$, or $R^{6c}$ and $^{7c}$ or $R^x$ and $R^y$ include butylene and pentylene groups. The ring structure may include an oxygen or sulfur atom or an ester or amide bond.

Preferably, part of the $R^{1c}$ to $R^{5c}$ are linear or branched alkyl groups, cycloalkyl groups, or linear, branched, or cyclic alkoxy groups; and more preferably, the total number of carbons in the groups $R^{1c}$ to $R^{5c}$ is 2 to 15. Under such a condition, the acid generator is more soluble in solvent, suppressing generation of particles during storage.

The alkyl group or cycloalkyl group of $R^x$ and $R^y$ may be the same as the alkyl group or cycloalkyl group of $R^{1c}$ to $R^{7c}$.

$R^x$ and $R^y$ are preferably a 2-oxoalkyl group or an alkoxycarbonylmethyl group.

The 2-oxoalkyl group may be a group having $>C=O$ at the 2-position of the alkyl group or cycloalkyl group of $R^{1c}$ to $R^{5c}$. The alkoxy group in the alkoxycarbonylmethyl group may be the same as the alkoxy group of $R^{1c}$ to $R^{5c}$.

$R^x$ and $R^y$ each preferably represent an alkyl group or cycloalkyl group having 4 or more carbon atoms, and more preferably an alkyl group or cycloalkyl group having 6 or more carbon atoms, and further preferably an alkyl group or cycloalkyl group having 8 or more carbon atoms.

In Formulae (b2) and (b3), $R^{204}$ to $R^{207}$ each independently represent an aryl group, an alkyl group, or a cycloalkyl group.

$X^-$ represents a non-nucleophilic anion, and may be the same as the non-nucleophilic anion as $X^-$ in Formula (b1).

The aryl group of $R^{204}$ to $R^{207}$ is preferably a phenyl or naphthyl group and more preferably a phenyl group. The alkyl group of $R^{204}$ to $R^{207}$ may be a linear or branched group, and is preferably, for example, a linear or branched alkyl group having 1 to 10 carbons (for example, methyl, ethyl, propyl, butyl, or pentyl). The cycloalkyl group of $R^{204}$ to $R^{207}$ is preferably, for example, a cycloalkyl group having 3 to 10 carbons (for example, cyclopentyl, cyclohexyl, or norbornyl).

Examples of the substituents that $R^{204}$ to $R^{207}$ may have include alkyl groups (e.g., those having 1 to 15 carbon atoms), cycloalkyl groups (e.g., those having 3 to 15 carbon atoms), aryl groups (e.g., those having 6 to 15 carbon atoms), alkoxy groups (e.g., those having 1 to 15 carbon atoms), halogen atoms, a hydroxyl group, and a phenylthio group.

Other usable examples of the compounds that generates acid by irradiation of active light or radiation ray include the compounds represented by the following Formulae (b4), (b5), and (b6).

(b4)

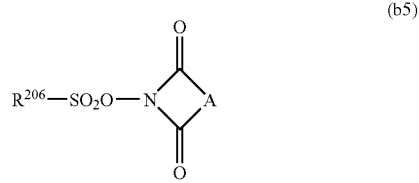

(b5)

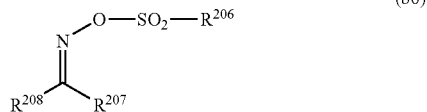

(b6)

In Formulae (b4) to (b6), $Ar^3$ and $Ar^4$ each independently represent an aryl group.

$R^{206}$, $R^{207}$ and $R^{208}$ each independently represent an alkyl, cycloalkyl or aryl group.

A represents an alkylene, alkenylene or arylene group.

Examples of the polymerization initiator preferably include the compounds represented by the following Formulae (b1) to (b3). The polymerization initiator preferably has a sulfonium salt structure, more preferably has a triarylsulfonium salt structure, and particularly preferably has a tri(chlorophenyl)sulfonium salt structure. Examples of tri(chlorophenyl)sulfonium salt structure-containing polymerization initiators include Compounds (b-37) to (b-40) shown below as examples of the polymerization initiators.

Examples of preferred compounds that may be used as the polymerization initiators in the invention include, however are not limited to, Compounds (b-1) to (b-96) shown below.

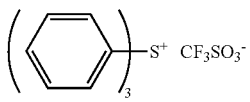

(b-1)

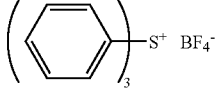

(b-2)

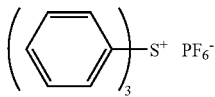

(b-3)

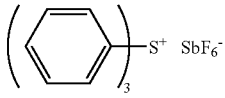

(b-4)

-continued
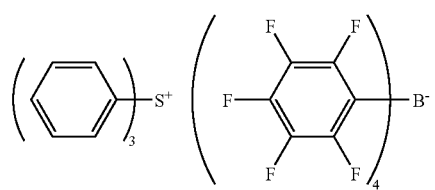 (b-5)
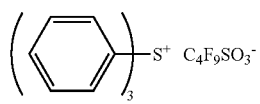 (b-6)
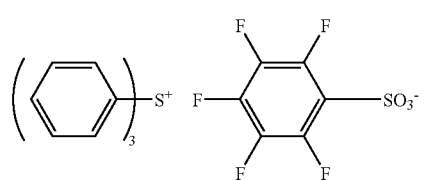 (b-7)
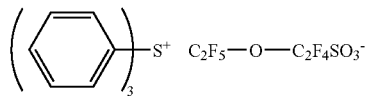 (b-8)
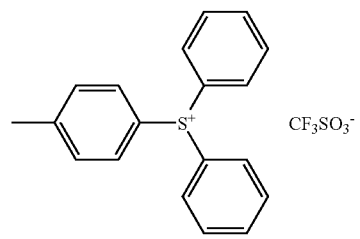 (b-9)
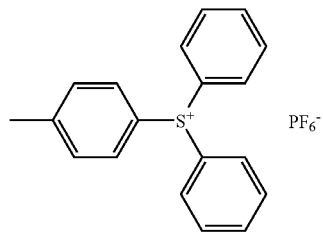 (b-10)
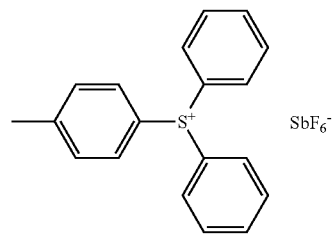 (b-11)
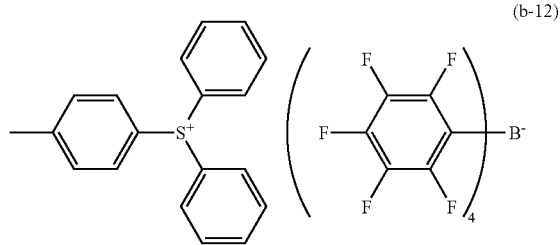 (b-12)
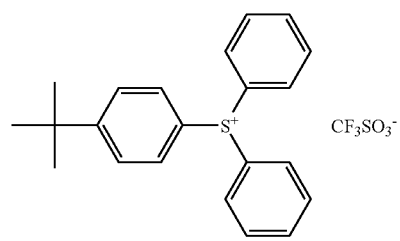 (b-13)
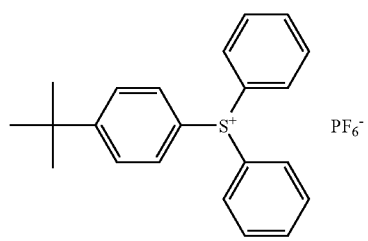 (b-14)
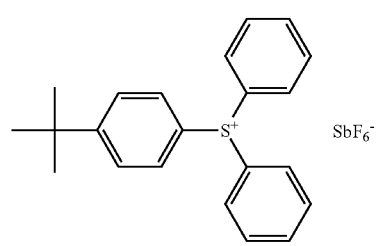 (b-15)
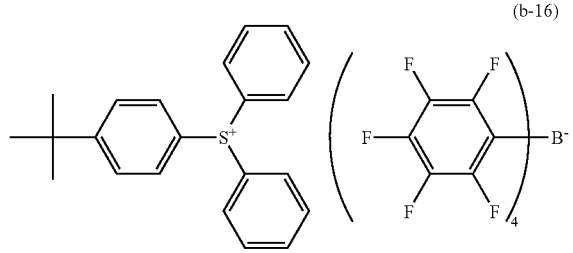 (b-16)
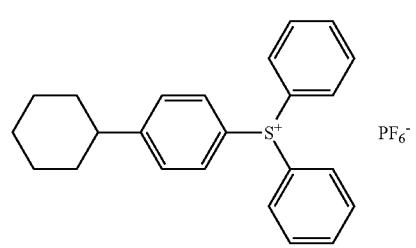 (b-17)
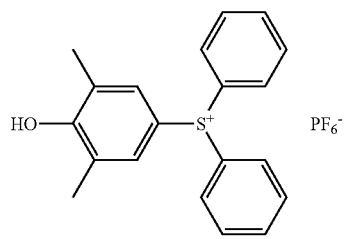 (b-18)

-continued
(b-19)
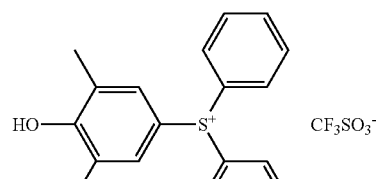
(b-20)
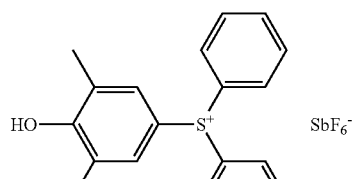
(b-21)
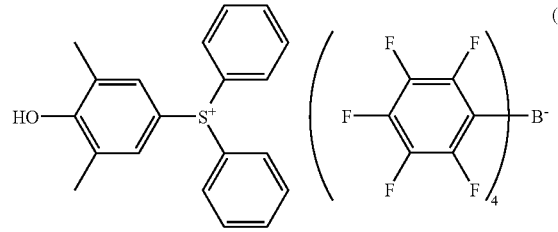
(b-22)
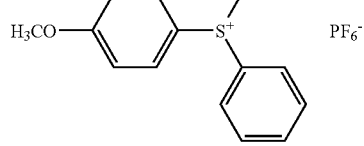
(b-23)
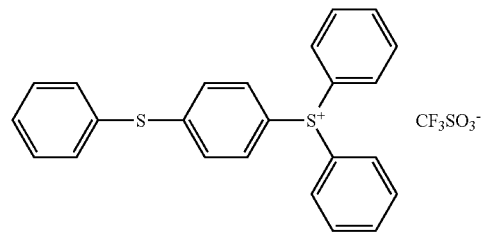
(b-24)
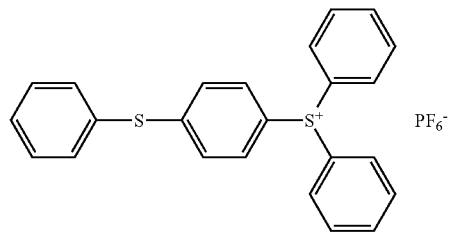
(b-25)
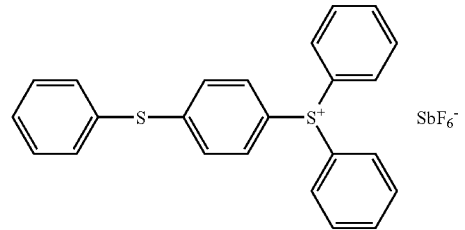
(b-26)
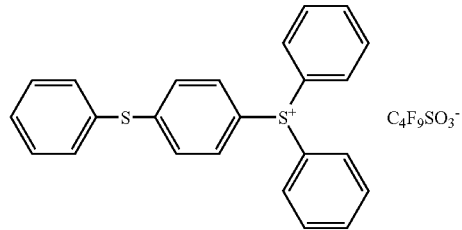
(b-27)
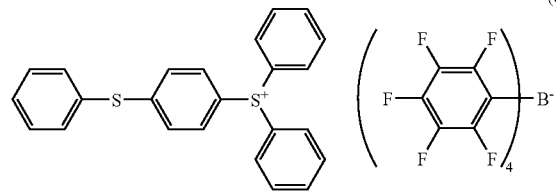
(b-28)
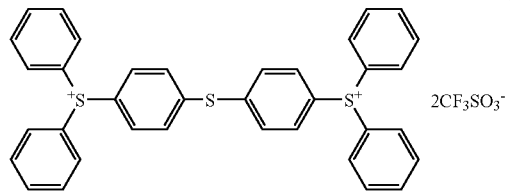
(b-29)
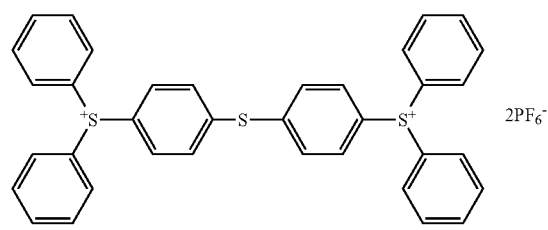
(b-30)
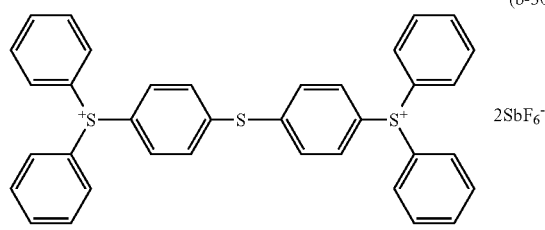
(b-31)
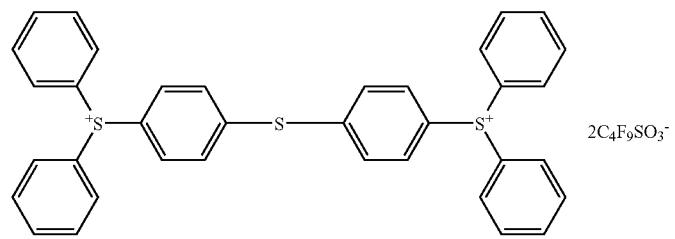

-continued
(b-32)
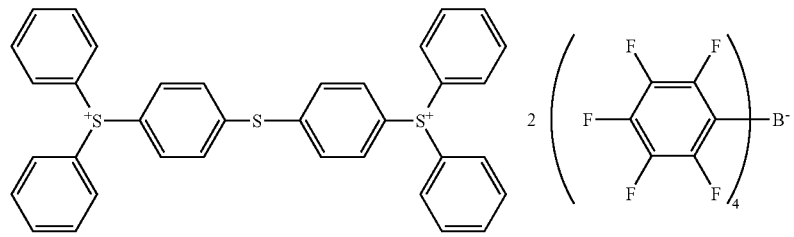
(b-33)
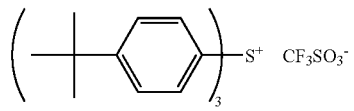
(b-34)
(b-35)
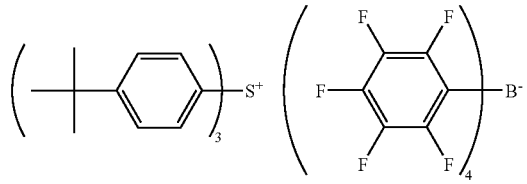
(b-36)
(b-37)
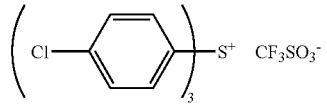
(b-38)
(b-39)
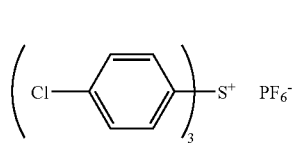
(b-40)
(b-41)
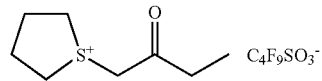
(b-42)
(b-43)
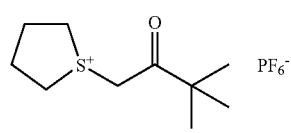
(b-44)
(b-45)
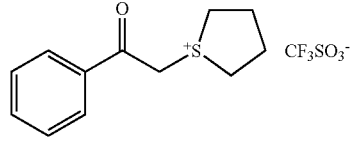
(b-46)
(b-47)
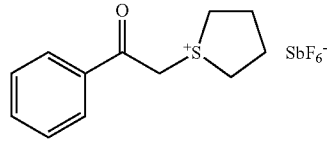
(b-48)

-continued
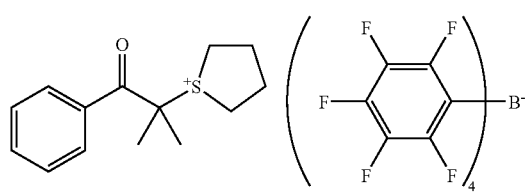
(b-49)
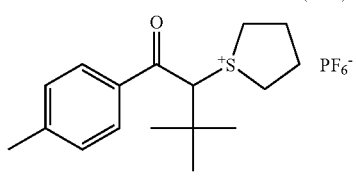
(b-49)
(b-50)
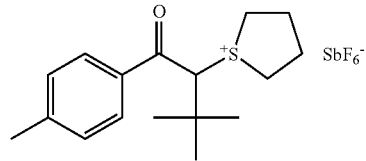
(b-51)
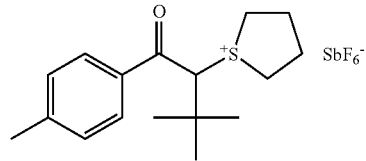
(b-52)
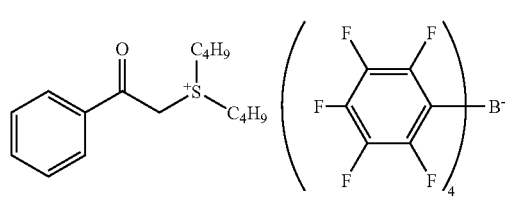
(b-53)
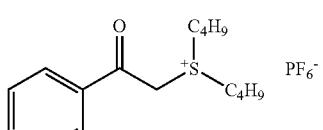
(b-54)
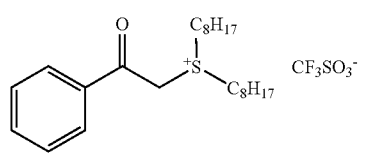
(b-55)
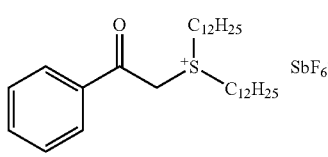
(b-56)
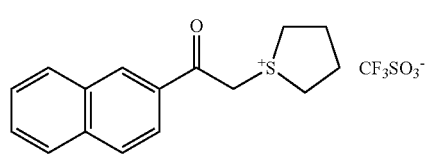
(b-57)
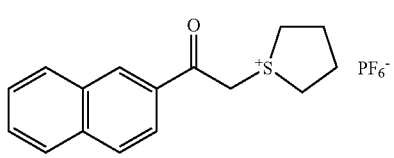
(b-58)
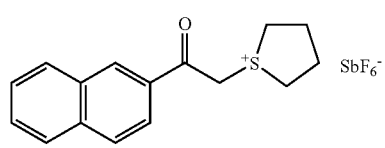
(b-59)
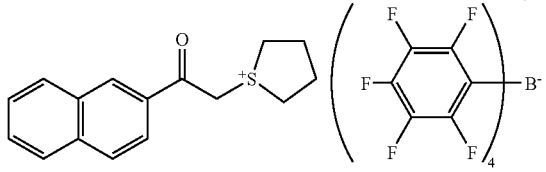
(b-60)
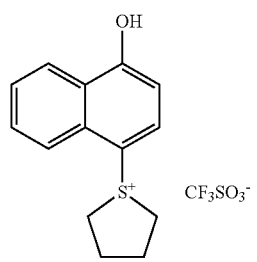
(b-61)
(b-62)
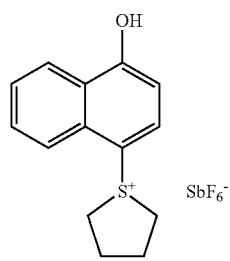
(b-63)
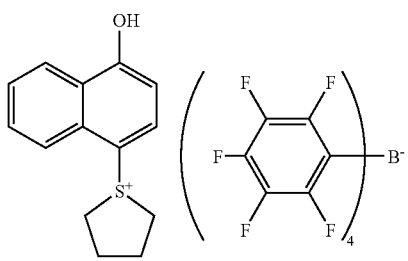
(b-64)

-continued
(b-65)
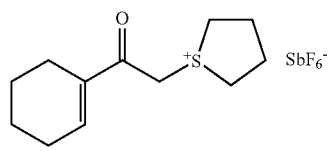
(b-66)
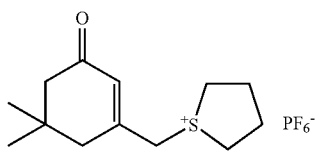
(b-67)
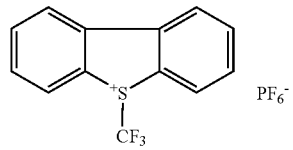
(b-68)
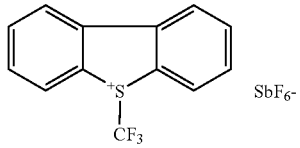
(b-69)
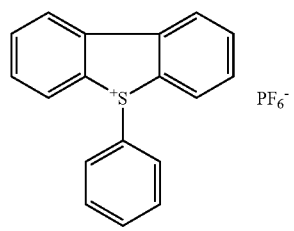
(b-70)
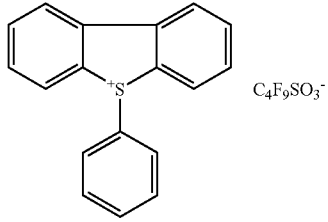
(b-71)
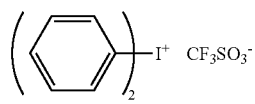
(b-72)
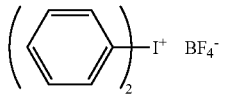
(b-73)
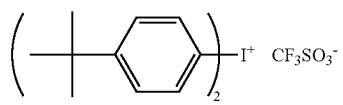
(b-74)
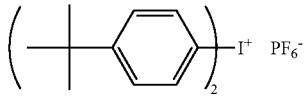
(b-75)
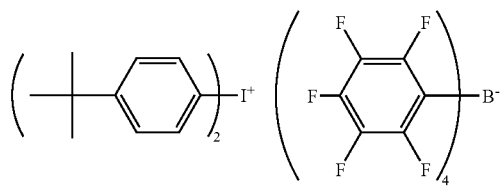
(b-76)
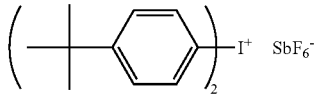
(b-77)
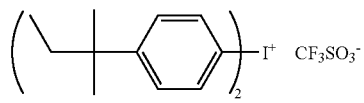
(b-78)
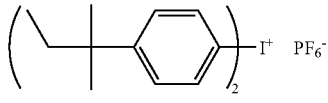
(b-79)
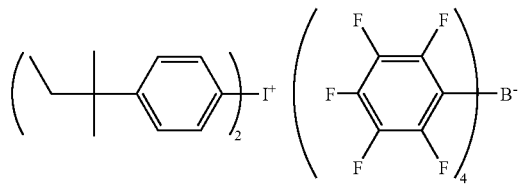
(b-80)
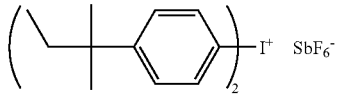
(b-81)
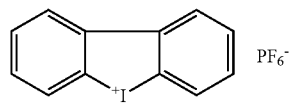
(b-82)
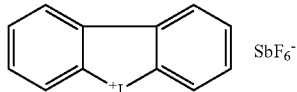
(b-83)
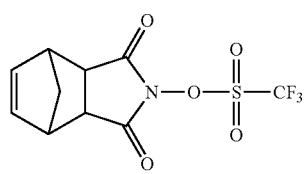
(b-84)
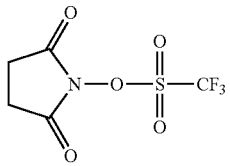

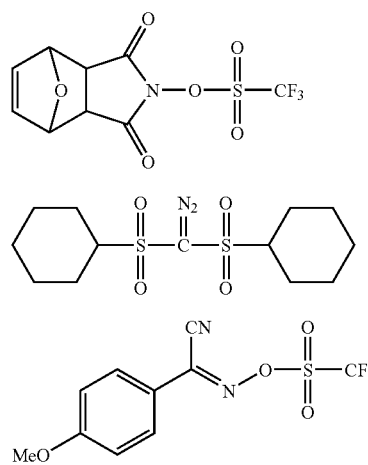
(b-85)

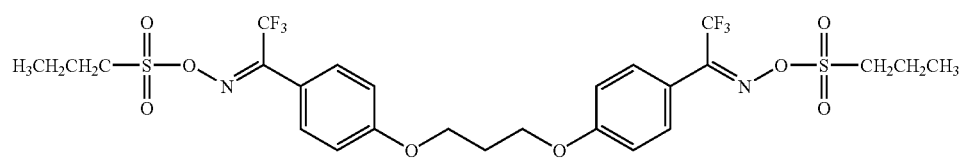
(b-86)

(b-87)

(b-88)

(b-89)

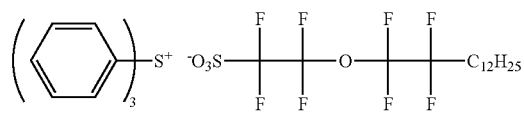

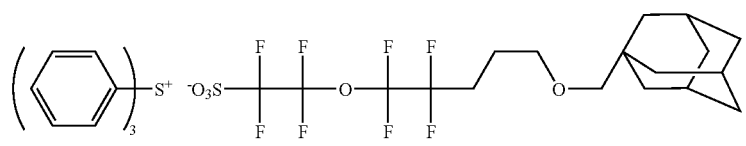
(b-90)

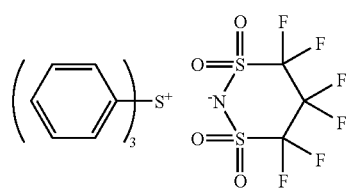
(b-91)

(b-92)

(b-93)

(b-94)

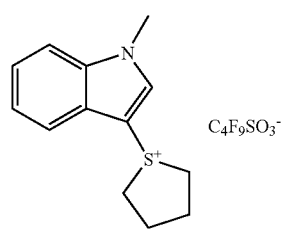
(b-95)

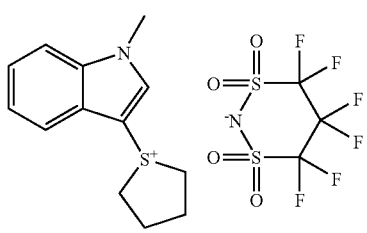
(b-96)

In addition, the oxazole derivatives, s-triazine derivatives and the like disclosed in JP-A No. 2002-122994, paragraphs [0029] to [0030], may also be used favorably.

Further, the onium salt and sulfonate compounds exemplified in JP-A No. 2002-122994, paragraphs [0037] to [0063], may also be used favorably.

One of the polymerization initiators may be used alone, or two or more oh them may be used in combination.

The amount of the polymerization initiator in the photo-curable composition is preferably from 0.1 to 20% by mass, more preferably from 0.5 to 10% by mass, even more preferably from 1 to 7% by mass, with respect to the total solid content of the photo-curable composition.

Other Components

If necessary, any of various additives as described below may be used in the invention.

Ultraviolet-Absorbing Agent

In the invention, an ultraviolet absorbing agent may be used from the viewpoints of improving the weather resistance of the resultant curable composition or preventing discoloration of the resultant curable composition.

Examples of the ultraviolet absorbing agent include: the benzotriazole compounds disclosed in JP-A Nos. 58-185677, 61-190537, 02-782, 05-197075, and 09-34057; the benzophenone compounds disclosed in JP-A Nos. 46-2784 and 05-194483 and U.S. Pat. No. 3,214,463; the cinnamic acid compounds disclosed in JP-B Nos. 48-30492 and 56-21141 and JP-A No. 10-88106; the triazine compounds disclosed in JP-A Nos. 04-298503, 08-53427, 08-239368, and 10-182621 and Japanese Patent Application National Publication (Laid-Open) No. 08-501291; the compounds disclosed in Research Disclosure No. 24239; and compounds capable of absorbing ultraviolet rays and emitting fluorescence, so-called fluorescent brightening agents, such as stilbene compounds or benzoxazole compounds.

The addition amount of the ultraviolet absorbing agent is preferably from 0.5 to 15% by mass, with respect to the solid content of the photo-curable composition, while the amount may be selected as appropriate depending on the purpose.

Sensitizer

In the invention, if necessary, a sensitizer may be added to improve the acid generation efficiency of the polymerization initiator or impart sensitivity to light having longer wavelengths. Any sensitizer capable of increasing the sensitivity of the polymerization initiator owing to an electron or energy transfer mechanism may be used. Examples of the sensitizer preferably include: polycondensed aromatic ring compounds such as anthracene, 9,10-dialkoxyanthracene, pyrene, or perylene; aromatic ketone compounds such as acetophenone, benzophenone, thioxanthone, or Michler's ketone; and heterocyclic compounds such as phenothiazine or N-aryl oxazolidinone. The addition amount of the sensitizer is preferably from 0.01 to 1% by mole, more preferably from 0.1 to 0.5% by mole with respect to the polymerization initiator, while the amount may be selected as appropriate depending on the purpose.

Antioxidant

An antioxidant may be added according to the invention, for improvement of stability of the ink composition. Examples of the antioxidants include those described in EP Laid-Open Nos. 223739, 309401, 309402, 310551, 310552, and 459416, German Patent Laid-Open No. 3435443, JP-A Nos. 54-48535, 62-262047, 63-113536, 63-163351, 2-262654, 2-71262, 3-121449, 5-61166, and 5-119449, U.S. Pat. Nos. 4,814,262 and 4,980,275, and the like.

The addition amount of the antioxidant may be decided as appropriate according to applications, but generally, approximately 0.1 to 8% by mass with respect to the solid content of the photo-curable composition.

Antifading Agent

Various types of organic antifading agents and metal complex antifading agents may be used in the invention. Examples of the organic antifading agents include hydroquinones, alkoxy phenols, dialkoxy phenols, phenols, anilines, amines, indanes, chromanes, alkoxy anilines, and heterocycles. Examples of the metal complex antifading agents include nickel complexes and zinc complexes. Specific examples thereof include the compounds described in patents cited in Research Disclosure No. 17643, VII, Sections I to J, Research Disclosure No. 15162, Research Disclosure No. 18716, p. 650 left column, Research Disclosure No. 36544, p. 527, Research Disclosure No. 307105, p. 872, and Research Disclosure No. 15162, and the compounds included in the formula of typical compounds and compound examples described in JP-A No. 62-215272, pp. 127-137.

The addition amount of the antifading agent may be selected as appropriate according to purpose, but preferably 0.1 to 8% by mass with respect to the solid content of the photo-curable composition.

Electrically-Conductive Salts

When the photo-curable composition of the invention is used as an inkjet recording ink composition, an electrically-conductive salt such as potassium thiocyanate, lithium nitrate, ammonium thiocyanate, or dimethylamine hydrochloride may be added to control discharging properties.

Solvent

When the photo-curable composition of the invention is used as an inkjet recording ink composition, an extremely small amount of an organic solvent may also be effectively added to improve the adhesiveness of the composition to the recording medium.

Examples of such a solvent include: ketone solvents such as acetone, methyl ethyl ketone or diethyl ketone; alcohol solvents such as methanol, ethanol, 2-propanol, 1-propanol, 1-butanol, or tert-butanol; chloride solvents such as chloroform or methylene chloride; aromatic solvents such as benzene and toluene; ester solvents such as ethyl acetate, butyl acetate or isopropyl acetate; ether solvents such as diethyl ether, tetrahydrofuran or dioxane; and glycol ether solvents such as ethylene glycol monomethyl ether or ethylene glycol dimethyl ether.

In this case, the solvent may be added in such an amount that no problem with solvent resistance or due to volatile organic compounds (VOC) occurs. The amount of the solvent in the entire photo-curable composition is preferably from 0.1 to 5% by mass, more preferably from 0.1 to 3% by mass.

Polymer Compound

Various types of polymer compounds may be added according to the invention for the purpose of controlling the physical properties of the film formed by curing. Examples of the polymer compounds include acrylic polymers, polyvinylbutyral resins, polyurethane resins, polyamide resins, polyester resins, epoxy resins, phenol resins, polycarbonate resins, polyvinylbutyral resins, polyvinylformal resins, shellac, vinyl resins, acrylic resins, rubber resins, waxes, and other natural resins. Two or more of the resins may be used in combination. Among them, vinyl copolymers obtained by copolymerization with an acrylic monomeric are preferable. In addition, copolymers including a "carboxyl group-containing monomer", an "alkyl methacrylate ester", or an "alkyl acrylate ester" as the structural unit as a copolymerization component are also used favorably for the polymer binding material.

Surfactant

In the invention, a surfactant may be added to the composition.

The surfactant disclosed in each of JP-A No. 62-173463 and 62-183457 may be used. Examples of the surfactant include: anionic surfactants such as dialkyl sulfosuccinates, alkylnaphthalenesulfonates or fatty acid salts; nonionic surfactants such as polyoxyethylene alkyl ethers, polyoxyethylene alkylaryl ethers, acetylene glycols, or polyoxyethylene-polyoxypropylene block copolymers; and cationic surfactants such as alkylamine salts or quaternary ammonium salts. An organic fluoro-compound may be used in place of these specific surfactants. The organic fluoro-compound may be hydrophobic. Examples of the organic fluoro-compound include fluoride surfactants, oily fluoro-compounds (such as fluorinated oils), and solid fluorinated resins (such as ethylene tetrafluoride resins), and the organic fluoro-compounds disclosed in JP-B No. 57-9053 (Columns 8 to 17) and JP-A No. 62-135826.

Storage Stabilizer

A storage stabilizer may be used to suppress undesirable polymerization during the storage of the photo-curable composition, and a storage stabilizer that is soluble in the photo-curable composition may be used in the invention. Examples of the storage stabilizer include quaternary ammonium salts, hydroxyamines, cyclic amides, nitriles, substituted ureas, heterocyclic compounds, organic acids, hydroquinone, hydroquinone monoethers, organic phosphines, and copper compounds. Specific examples thereof include benzyltrimethylammonium chloride, diethylhydroxylamine, benzothiazole, 4-amino-2,2,6,6-tetramethylpiperidine, citric acid, hydroquinone monomethyl ether, hydroquinone monobutyl ether, and copper naphthenate.

The amount of the storage stabilizer to be used in the photo-curable composition is preferably from 0.005 to 1% by mass, more preferably from 0.01 to 0.5% by mass, even more preferably from 0.01 to 0.2% by mass, while the amount may be controlled as appropriate depending on the activity of the polymerization initiator to be used, the polymerization properties of the polymerizable compound, or the type of the storage stabilizer. When the addition amount is too low, the storage stability may be deteriorated, while when the addition amount is too high, curability may be low.

In addition, a leveling additive, a matting agent, a wax for adjustment of film physical properties, or a tackifier for improvement of the adhesiveness to the recording medium such as of polyolefin or PET that does not inhibit polymerization may be added as needed to the composition according to the invention.

Specific examples of the tackifier include sticky high-molecular-weight polymers (such as copolymers of an ester of (meth)acrylic acid and an alcohol containing an alkyl group having 1 to 20 carbon atoms, copolymers of an ester of (meth)acrylic acid and an alicyclic alcohol having 3 to 14 carbon atoms, or copolymers of an ester of (meth)acrylic acid and an aromatic alcohol having 6 to 14 carbon atoms) and low-molecular-weight tackifying resins having a polymerizable unsaturated bond.

Exemplary Embodiments of the Photo-Curable Composition

When the photo-curable composition of the invention is used as an inkjet recording ink composition, the photo-curable composition may have a viscosity of 7 mPa·s to 30 mPa·s, and more preferably of 7 mPa·s to 20 mPa·s, at a temperature at when the photo-curable composition is discharged (such as a temperature of from 40° C. to 80° C., preferably a temperature of from 25° C. to 30° C.), from the viewpoint of favorable discharging properties. The photo-curable composition of the invention may have a viscosity of 35 to 500 mPa·s, more preferably of 35 to 200 mPa·s, at room temperature (25 to 30° C.). The ratio of the components of the photo-curable composition of the invention may be controlled as appropriate such that it has a viscosity within the above ranges. If the viscosity at room temperature is set to a high degree, permeation of the ink through a recording medium may be avoided even when the recording medium used is porous, and the occurrence of uncured monomers and odors may be reduced. In this case, smearing of the ink may also be reduced when the ink droplets are deposited and image quality may be improved.

The photo-curable composition of the invention may have a surface tension of 20 to 30 mN/m, more preferably of 23 to 28 mN/m. For recording on various recording media such as polyolefin, PET, coated paper, or uncoated paper, the surface tension is preferably 20 mN/m or more from the viewpoints of smearing and permeation, and preferably 30 mN/m or less from the viewpoint of wettability.

The photo-curable composition of the invention may preferably be used as an inkjet recording ink. The photo-curable composition used as an inkjet recording ink may be ejected from an inkjet printer onto a recording medium, and then irradiated with a radiation so that it may be cured in recording.

Since the image portion is cured by irradiation of the radiation such as ultraviolet rays, and the image portion has an excellent strength, the printed material obtained by the ink composition may be used for various usages such as formation of an ink receiving layer (image portion) of a planographic printing plate, in addition to image formation by the ink.

Inkjet Recording Method and Printed Materials

A description is given below of an inkjet recording method (the inkjet recording method of the invention) in which the photo-curable composition of the invention is preferably used.

The inkjet recording method of the invention includes discharging the photo-curable composition of the invention from an inkjet recording apparatus onto a recording medium (such as a support or a recording material) and irradiating the discharged photo-curable composition with an active radiation to cure the photo-curable composition. The cured photo-curable composition forms an image on the recording medium.

The recording medium applicable to the inkjet recording method according to the invention is not particularly limited, and examples thereof include papers such as ordinary uncoated paper and coated paper, various unabsorbent resin materials and films thereof used for so-called soft packaging. Examples of the various plastic films include a PET film, an OPS film, an OPP film, an ONy film, a PVC film, a PE film, and a TAC film. Other examples of the plastics useful as the recording medium material include polycarbonate, acrylic resins, ABS, polyacetal, PVA, and rubbers. Metals and glasses may also be used as the recording medium.

In addition, another example of the recording material applicable to the invention includes the support of the planographic printing plate described below.

Examples of the active radiation applicable to the inkjet recording method according to the invention include α rays, γ rays, X rays, ultraviolet light, visible light, infrared light, and electron beams. The peak wavelength of the active radiation is preferably 200 to 600 nm, more preferably 300 to 450 nm, and further preferably 350 to 420 nm. The power of the active radiation is preferably 2,000 mJ/cm$^2$ or less, more preferably 10 to 2,000 mJ/cm$^2$, further preferably 20 to 1,000 mJ/cm$^2$, and most preferably 50 to 800 mJ/cm$^2$.

In particular, according to the inkjet recording method according to the invention, the radiation is preferably emitted from a light emitting diode which emits ultraviolet light having an emission peak wavelength of 350 to 420 nm and achieving a maximum illumination intensity of 10 to 2,000 mW/cm$^2$ on the surface of the above-described recording medium.

The printed material obtained by the inkjet recording method of the invention has thereon an image produced by the photo-curable composition of the invention. Therefore, the printed image on the printed material has a high light fastness. The photo-curable composition of the invention includes an oil-soluble dye rather than a pigment. Therefore, the photo-curable composition may include a larger amount of the dye, because there is no need to take into account a reduction in dispersibility caused by the use of pigments. Therefore, bright colors may be achieved even in an image formed by a thinner layer of the ink composition.

Inkjet Recording Apparatus

The inkjet recording apparatus to be used in the invention is not particularly limited, and any commercially available inkjet recording apparatus may be used. That is, in the invention, an image may be recorded on a recording medium using a commercially available inkjet recording apparatus.

The inkjet recording apparatus used in the invention may include an ink-supplying system, a temperature sensor, and a radiation ray source.

The ink-supplying system may include a stock tank in which an inkjet composition of the invention is stored, a supply pipe, an inkjet composition-supplying tank provided near the end of a supply pipe at an inkjet head side, a filter, and a piezoelectric inkjet head. The piezoelectric inkjet head allows ejection of multi-sized dots in amounts of, for example, 1 to 100 pl, preferably, 8 to 30 pl, at a definition, of for example, 320×320 to 4,000×4,000 dpi, preferably 400× 400 to 1,600×1,600 dpi, and more preferably 720×720 dpi. "Dpi" as used in the invention means "dots per inch", or the number of dots per 2.54 cm.

As described above, since a radiation-curable ink preferably has a constant temperature at the time of ejection, the section from the ink supply tank to the inkjet head may be thermally insulated and heated. The method for controlling the temperature is not limited, and preferable examples thereof include a method of providing a plurality of temperature sensors in piping areas, thereby controlling the temperature in accordance with the ink flow and the environmental temperature. The temperature sensors may be provided on the ink supply tank and in the vicinity of the nozzle of the inkjet head. The head unit to be heated is preferably thermally blocked or insulated. In order to reduce the warm-up time of the printer, or reduce the heat energy loss, it is preferable that the head unit be thermally insulated from other sections, and the thermal capacity of the whole unit be heated be preferably smaller.

Hereinafter, exemplary embodiments of the present invention are described.

(1) A photo-curable composition, comprising:
a polymerizable compound;
a polymerization initiator; and
a dye represented by Formula (1):

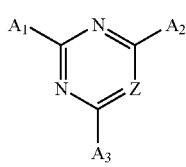

Formula (1)

wherein, $A_1$, $A_2$ and $A_3$ each independently represents a monovalent group, and Z represents a nitrogen atom, an oxygen atom, a sulfur atom, or a monovalent group-bonded carbon atom, the dye represented by Formula (1) having two azo groups.

(2) The photo-curable composition of item (1), wherein the monovalent group is a hydrogen atom or a monovalent substituent.

(3) The photo-curable composition of item (1), wherein the monovalent substituent is selected from the group consisting of a halogen atom, an alkyl group, a cycloalkyl group, an aralkyl group, an alkenyl group, an alkynyl group, an aryl group, a heterocyclic group, a cyano group, a hydroxyl group, a nitro group, an alkoxy group, an aryloxy group, a silyloxy group, a heterocyclooxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkylsulfonylamino group, an arylsulfonylamino group, an alkylthio group, an arylthio group, a heterocyclothio group, a sulfamoyl group, an alkylsulfinyl group, an arylsulfinyl group, an alkylsulfonyl group, an arylsulfonyl group, an acyl group, an aryloxycarbonyl group, an alkoxycarbonyl group, a carbamoyl group, a phosphino group, a phosphinyl group, a phosphinyloxy group, a phosphinylamino group, a silyl group, an azo group, and an imido group.

(4) The photo-curable composition of item (1), wherein one or two selected from $A_1$, $A_2$ and $A_3$ each independently represents a monovalent substituent containing an azo group.

(5) The photo-curable composition of item (4), wherein the dye represented by Formula (1) has one monovalent substituent including two azo groups.

(6) The photo-curable composition of item (4), wherein the dye represented by Formula (1) has two monovalent substituents, each respectively including one azo group.

(7) The photo-curable composition of item (1), wherein the amount of the dye represented by Formula (1) is 0.05% by mass to 20% by mass in the photo-curable composition.

(8) The photo-curable composition of item (1), wherein the polymerizable compound is a cationically polymerizable compound or a radically-polymerizable compound.

(9) The photo-curable composition of item (8), wherein the cationically polymerizable compound is selected from the group consisting of an epoxy compound, a vinyl ether compound and an oxetane compound.

(10) The photo-curable composition of item (1), wherein the photo-curable composition has a surface tension of 20 mN/m to 30 mN/m.

(11) The photo-curable composition of item (1), wherein the dye represented by Formula (1) is represented by Formula (2):

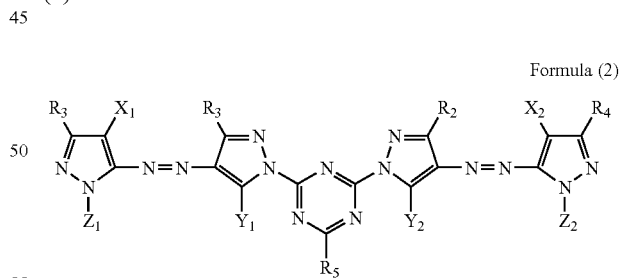

Formula (2)

wherein, $Y_1$, $Y_2$, $Z_1$, $Z_2$, and $R_1$ to $R_5$ each independently represents a monovalent group, and $X_1$ and $X_2$ each independently represents a monovalent electron-withdrawing group having a Hammett constant σp of 0.20 or more.

(12) The photo-curable composition of item (11), wherein the Hammett constant σp is 0.3 or more.

(13) The photo-curable composition of item (1) or (11), wherein the dye represented by Formula (1) is represented by Formula (3):

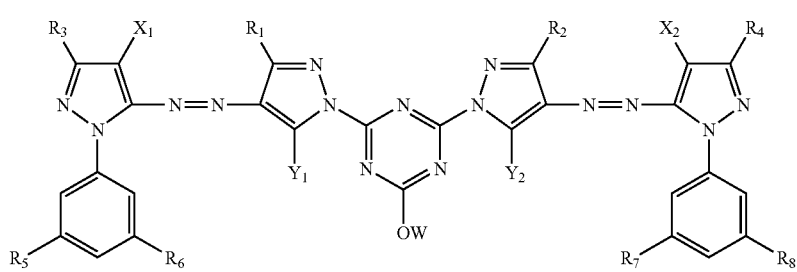

Formula (3)

wherein, W, $Y_1$, $Y_2$, and $R_1$ to $R_8$ each independently represents a monovalent group, and $X_1$ and $X_2$ each independently represents a monovalent electron-withdrawing group having a Hammett constant σp of 0.20 or more.

(14) The photo-curable composition of item (13), wherein the Hammett constant σp is 0.3 or more.

(15) An inkjet recording composition including the photo-curable composition of any one of items 1-14.

All publications, patent applications, and technical standards mentioned in this specification are herein incorporated by reference to the same extent as if each individual publication, patent application, or technical standard was specifically and individually indicated to be incorporated by reference.

EXAMPLES

Hereinafter, examples of the invention are described. However, the invention is not limited to these examples. Hereinafter, "parts" and "%" mean "parts by mass" and "% by mass," respectively, unless otherwise stated.

Example A1

Preparation of Ink A01

The following components are mixed with a high-speed, water-cooled stirring machine to form a yellow UV inkjet ink.

| Yellow Ink Composition | |
|---|---|
| ACTILANE 421 | 55.4 parts |
| (trade name; an acrylate monomer manufactured by Akcros Chemicals) | |
| PHOTOMER 2017 | 20.0 parts |
| (registered name; a UV diluent manufactured by EChem) | |
| SOLSPERSE 32000 | 0.4 parts |
| (registered name; a dispersing agent manufactured by Noveon) | |
| Dye (DYE-2) | 3.6 parts |
| GENORAD 16 | 0.05 parts |
| (trade name; a stabilizer manufactured by Rahn) | |
| RAPI-CURE DVE-3 | 4.0 parts |
| (registered name: vinyl ether manufactured by ISP Europe) | |
| LUCIRIN TPO | 8.5 parts |
| (trade name; a photopolymerization initiator manufactured by BASF) | |

| -continued | |
|---|---|
| Yellow Ink Composition | |
| Benzophenone | 4.0 parts |
| (a photopolymerization initiator) | |
| IRGACURE 184 | 4.0 parts |
| (trade name; a photopolymerization initiator manufactured by Ciba Specialty Chemicals Inc.) | |
| BYK 307 | 0.05 parts |
| (trade name; an anti-foaming agent manufactured by BYK Chemie) | |

The thus-prepared yellow ink is printed on a PET sheet and irradiated and cured with light by passing the sheet at a speed of 40 m/minute under an iron-doped ultraviolet lamp (power: 120 W/cm), to thereby obtain a printed material.

Evaluation of Ink

The properties of the ink are evaluated as described below.
Curability

The curability is evaluated sensorily by touching with the hand the image portion after curing of the printed ink. After exposure to light, a coating film with no stickiness is evaluated as A (excellent), a coating film that has slight stickiness but is not substantially spoiled by touching is evaluated as B (acceptable), and a coating film with significant stickiness is evaluated as C (inferior).

Light Resistance

The PET film having the image formed thereon is irradiated with xenon light (140,000 lx) for 14 days in a weather meter (ATLAS C. I65, trade name, manufactured by Atlas). The image density thereof is measured with a reflection densitometer (X-RITE 310TR, registered name, manufactured by X-Rite Inc.) before and after the xenon light irradiation, and the residual ratio of the colorant is evaluated as follows.
A: Excellent light resistance (the residual ratio of the colorant is >80%)
B: Acceptable light resistance (the residual ratio of the colorant is 40 to 80%)
C: Inferior light resistance (the residual ratio of the colorant is <40%)

Ejection Stability

After continuous ejection for 30 minutes, the presence or absence of nozzle clogging-induced defects (that is, the presence or absence of unprinted portions) and the presence or absence of small undesired dots (satellites) around printed dots on the printed material is visually evaluated as follows.
A: Neither nozzle defects nor satellites are generated.
B: A small number of nozzle defects or satellites are generated.
C: Conspicuous nozzle defects or satellites are generated.
Storage Stability After the thus-prepared ink is stored at 60° C. and 75% RH for 3 days, the viscosity of the ink is measured at an ejection temperature. Increase in the viscosity of the ink is evaluated by a viscosity ratio (that is, viscosity after storage/viscosity before storage). When the viscosity remains unchanged, namely, when the viscosity ratio is close to 1.0, the storage stability is excellent. A ratio of more than 1.5 is not preferred, because such a high ratio may lead to clogging during ejection. The evaluation criteria are as follows.

A: Excellent storage stability (a viscosity ratio of from 1 to less than 1.2)
B: Acceptable storage stability (a viscosity ratio of from 1.2 to less than 1.5)
C: Inferior storage stability (a viscosity ratio of 1.5 or more)

Preparation of Inks A02 to A09

Ink compositions are prepared and evaluated in the same manner as described above for Ink A01, except that each dye or comparative compound shown below is used in place of the dye (DYE-2) used for Ink A01.

Example A2

Ink A02

DYE-4 is used as the dye in place of DYE-2.

Example A3

Ink A03

DYE-8 is used as the dye in place of DYE-2.

Example A4

Ink A04

DYE-12 is used as the dye in place of DYE-2.

Example A5

Ink A05

DYE-19 is used as the dye in place of DYE-2.

Comparative Example A6

Ink A06

CROMOPHTAL YELLOW LA (registered name; a pigment manufactured by Ciba Specialty Chemicals Inc.) is used as a comparative compound in place of the dye (DYE-2).

Comparative Example A7

Ink A07

A comparative compound represented by the following structural formula is used in place of the dye (DYE-2).

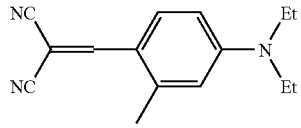

Comparative Example A8

Ink A08

A comparative compound represented by the following structural formula is used in place of the dye (DYE-2).

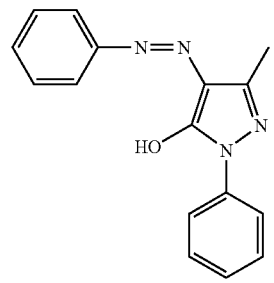

Comparative Example A9

Ink A09

A comparative compound represented by the following structural formula is used in place of the dye (DYE-2).

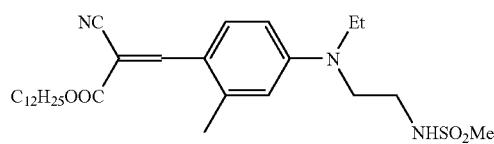

The evaluation results are shown in Table 1.

TABLE 1

|  | Evaluated Ink | Curability | Light Resistance | Ejection Stability | Storage Stability |
|---|---|---|---|---|---|
| Example A1 | Ink A01 | A | A | A | A |
| Example A2 | Ink A02 | A | A | A | A |
| Example A3 | Ink A03 | A | A | A | B |
| Example A4 | Ink A04 | A | A | A | A |
| Example A5 | Ink A05 | A | A | A | B |
| Comparative Example A6 | Ink A06 | A | A | C | B |
| Comparative Example A7 | Ink A07 | B | B | A | B |
| Comparative Example A8 | Ink A08 | C | C | A | C |
| Comparative Example A9 | Ink A09 | B | C | A | C |

As is evident from the results of Table 1, the inks including the dyes each represented by Formula (1) (i.e., Inks A01 to A05) according to the invention have significantly improved ejection stability, while maintaining favorable properties with respect to curability, light resistance and storage stability when compared with a conventional pigment-containing ink (Ink A06).

The inks according to the invention also have significantly improved light fastness and storage stability compared with conventional dye-containing inks (Inks A07 to A09).

Examples B1 to B5 and Comparative Examples B6 to B9

Preparation of Inks

In a similar manner to that in Example A1, the following components are mixed with a high-speed, water-cooled stirring machine, to thereby obtain yellow UV inkjet inks (Inks B01 to B09), respectively. The colorant selected and used in each of Inks B01 to B09 is the same as that in each of Inks A01 to A09.

| | |
|---|---|
| Light Acrylate L-A | 15.4 parts |
| (*an acrylate monomer manufactured by Kyoeisha Chemical Co., Ltd.) | |
| ACTILANE 421 | 36.0 parts |
| (trade name; the acrylate monomer manufactured by Akcros Chemicals) | |
| PHOTOMER 2017 | 20.0 parts |
| (registered name; a UV diluent manufactured by EChem) | |
| SOLSPERSE 32000 | 0.4 parts |
| (registered name; a dispersing agent manufactured by Noveon) | |
| Colorant | 3.6 parts |
| GENORAD 16 | 0.05 parts |
| (trade name; a stabilizer manufactured by Rahn) | |
| RAPI-CURE DVE-3 | 8.0 parts |
| (registered name; vinyl ether manufactured by ISP Europe) | |

-continued

| | |
|---|---|
| LUCIRIN TPO | 8.5 parts |
| (trade name; a photopolymerization initiator manufactured by BASF) | |
| Benzophenone | 4.0 parts |
| (a photopolymerization initiator) | |
| IRGACURE 184 | 4.0 parts |
| (trade name; a photopolymerization initiator manufactured by Ciba Specialty Chemicals Inc.) | |
| BYK 307 | 0.05 parts |
| (trade name; an anti-foaming agent manufactured by BYK Chemie) | |

*Light Acrylate L-A is lauryl acrylate (a monofunctional acrylate).

The inks are evaluated in the same manner as in Example A1. The results are shown in Table 2.

TABLE 2

| Evaluated Ink | Curability | Light Resistance | Ejection Stability | Storage Stability |
|---|---|---|---|---|
| Example B1 | B01 | A | A | A | A |
| Example B2 | B02 | A | A | A | A |
| Example B3 | B03 | A | A | A | B |
| Example B4 | B04 | A | A | B | B |
| Example B5 | B05 | B | B | B | B |
| Comparative Example B6 | B06 | A | A | C | B |
| Comparative Example B7 | B07 | B | B | A | B |
| Comparative Example B8 | B08 | C | B | A | C |
| Comparative Example B9 | B09 | B | C | B | C |

As is evident from the results of Table 2, the dye-containing inks according to the invention (i.e., Inks B01 to B05) have significantly improved ejection stability, as compared with a conventional pigment-containing ink (Ink B06), even when the ink composition is modified.

Similarly to Example A1, the inks according to the invention also have significantly improved light resistance and storage stability as compared with conventional dye inks (i.e., Inks B07 to B09).

What is claimed is:

1. A photo-curable composition, comprising:
   a polymerizable compound;
   a polymerization initiator; and
   a dye represented by Formula (3):

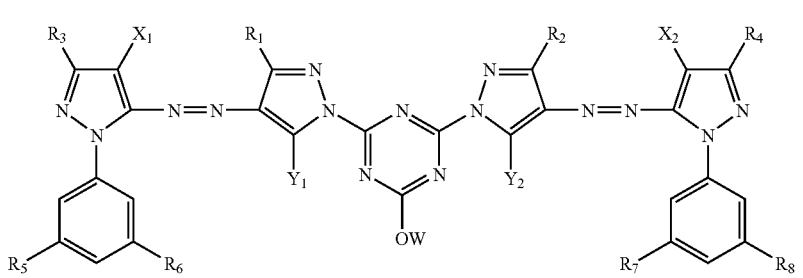

Formula (3)

wherein, W represents a monovalent group excluding a hydrogen atom, $Y_1$, $Y_2$ and $R_1$ to $R_8$ each independently represents a monovalent group, and $X_1$ and $X_2$ each independently represents a monovalent electron-withdrawing group having a Hammett constant $\sigma p$ of 0.20 or more.

2. The photo-curable composition of claim 1, wherein the amount of the dye represented by Formula (1) is 0.05% by mass to 20% by mass in the photo-curable composition.

3. The photo-curable composition of claim 1, wherein the polymerizable compound is a cationically polymerizable compound or a radically-polymerizable compound.

4. The photo-curable composition of claim 3, wherein the cationically polymerizable compound is selected from the group consisting of an epoxy compound, a vinyl ether compound and an oxetane compound.

5. The photo-curable composition of claim 1, wherein the photo-curable composition has a surface tension of 20 mN/m to 30 mN/m.

6. The photo-curable composition of claim 1, wherein the Hammett constant $\sigma p$ is 0.3 or more.

7. The photo-curable composition of claim 5, wherein the Hammett constant $\sigma p$ is 0.3 or more.

8. An inkjet recording composition including the photo-curable composition of claim 1.

9. The photo-curable composition of claim 1, wherein W is selected from the group consisting of a substituted or unsubstituted alkyl group having 1 to 12 carbon atoms, a substituted or unsubstituted aryl group having 6 to 18 carbon atoms, a substituted or unsubstituted heterocyclic group having 4 to 12 carbon atoms, an acyl group, a carbamoyl group, and a silyl group.

* * * * *